United States Patent
Shrestha et al.

(10) Patent No.: US 12,207,315 B2
(45) Date of Patent: Jan. 21, 2025

(54) RANDOM ACCESS RESPONSE WINDOW START IN NON-TERRESTRIAL NETWORKS

(71) Applicant: QUALCOMM Incorporated, San Diego, CA (US)

(72) Inventors: Bharat Shrestha, San Diego, CA (US); Alberto Rico Alvarino, San Diego, CA (US); Ayan Sengupta, San Diego, CA (US); Xiao Feng Wang, San Diego, CA (US); Umesh Phuyal, San Diego, CA (US); Liangping Ma, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/810,726

(22) Filed: Jul. 5, 2022

(65) Prior Publication Data

US 2023/0094907 A1    Mar. 30, 2023

Related U.S. Application Data

(60) Provisional application No. 63/250,609, filed on Sep. 30, 2021.

(51) Int. Cl.
*H04W 74/0833* (2024.01)
*H04W 74/08* (2024.01)
*H04W 84/06* (2009.01)

(52) U.S. Cl.
CPC ......... *H04W 74/0841* (2013.01); *H04W 74/0866* (2013.01); *H04W 84/06* (2013.01)

(58) Field of Classification Search
CPC ......... H04W 74/0841; H04W 74/0866; H04W 84/06
See application file for complete search history.

(56) References Cited

U.S. PATENT DOCUMENTS

| | | | |
|---|---|---|---|
| 2015/0117374 A1* | 4/2015 | Wu | H04W 74/0891 370/329 |
| 2021/0297149 A1* | 9/2021 | Hsieh | H04W 56/005 |
| 2022/0006514 A1* | 1/2022 | Sedin | H04L 1/1883 |

OTHER PUBLICATIONS

Apple: "Timing Relationship Enhancements for NR NTN", 3GPP TSG RAN WG1 #105-e, R1-2105101, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 6 Pages, May 12, 2021, XP052011190, RAR window starting time, p. 4, paragraph 2.4.

(Continued)

*Primary Examiner* — James P Duffy
(74) *Attorney, Agent, or Firm* — Patterson + Sheridan, LLP

(57) ABSTRACT

Certain aspects of the present disclosure provide techniques and apparatus for random access channel communications in non-terrestrial networks. A method that may be performed by a user equipment (UE) includes transmitting a physical random access channel (PRACH) preamble to the network entity in a random access (RA) occasion; and monitoring for a random access response (RAR) within a RAR window with a start position determined based at least in part on the RA occasion, round trip time parameters for non-terrestrial network communications, and one or more timing offset parameters.

26 Claims, 12 Drawing Sheets

(56) References Cited

OTHER PUBLICATIONS

CMCC: "Discussion on Timing Relationship Enhancements for NTN", 3GPP TSG RAN WG1 #105-e, R1-2104607, 3GPP, Mobile Competence Centre, 650, Route Des Lucioles, F-06921 Sophia-Antipolis Cedex, France, vol. RAN WG1, No. e-Meeting, May 10, 2021-May 27, 2021, 8 Pages, May 11, 2021, XP052006241, Issue #2: K_offset value determination, p. 3, paragraph 2.2, Issue #4: MAC CE timing relationships, p. 4, paragraph 2.4-p. 5, Issue #9: Start of RAR window, p. 6, paragraph 2.6-p. 7.
FGI, et al., "Timing Relationship Enhancements to NB-IoT NTN", 3GPP TSG RAN WG1 #106-e, R1-2107292, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, 7 Pages, Aug. 6, 2021, XP052033538, Start of RAR window, p. 3, paragraph 2.1.6.
International Search Report and Written Opinion—PCT/US2022/076789—ISA/EPO—Dec. 8, 2022.
ZTE: "Discussion on Timing Relationship for NR-NTN", 3GPP TSG RAN WG1 #105-e, R1-2105189, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 8 Pages, May 12, 2021, XP052011267, Start of Msg2/MsgB RAR window, p. 4, paragraph 4-p. 5.

\* cited by examiner

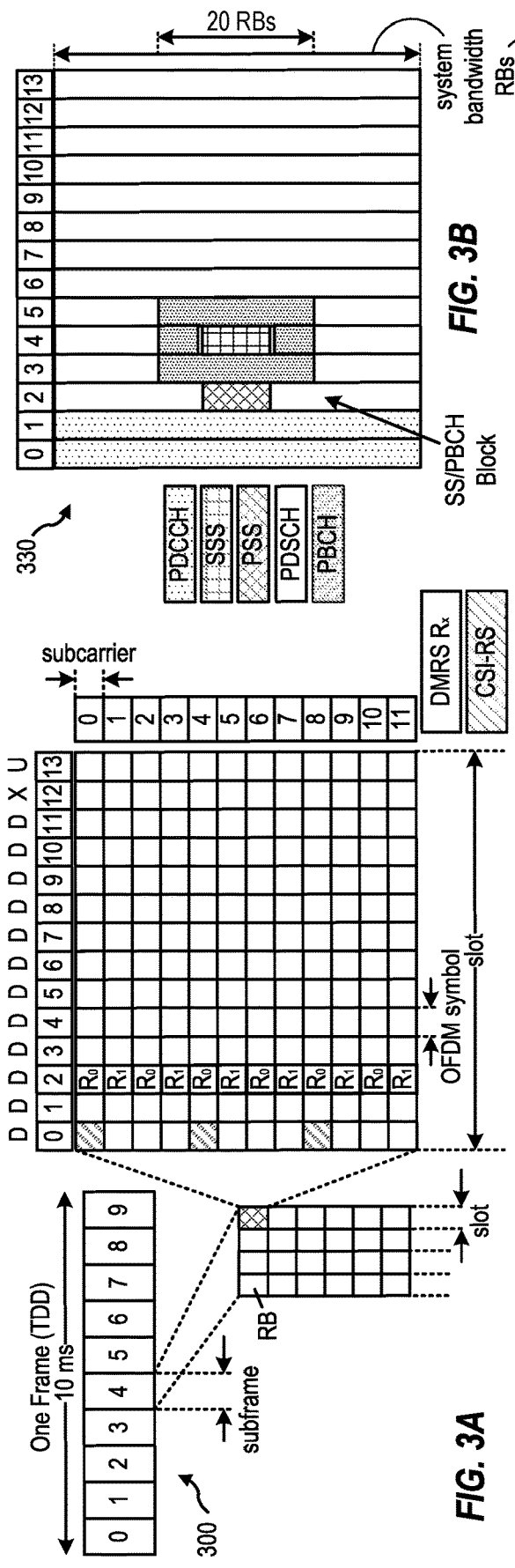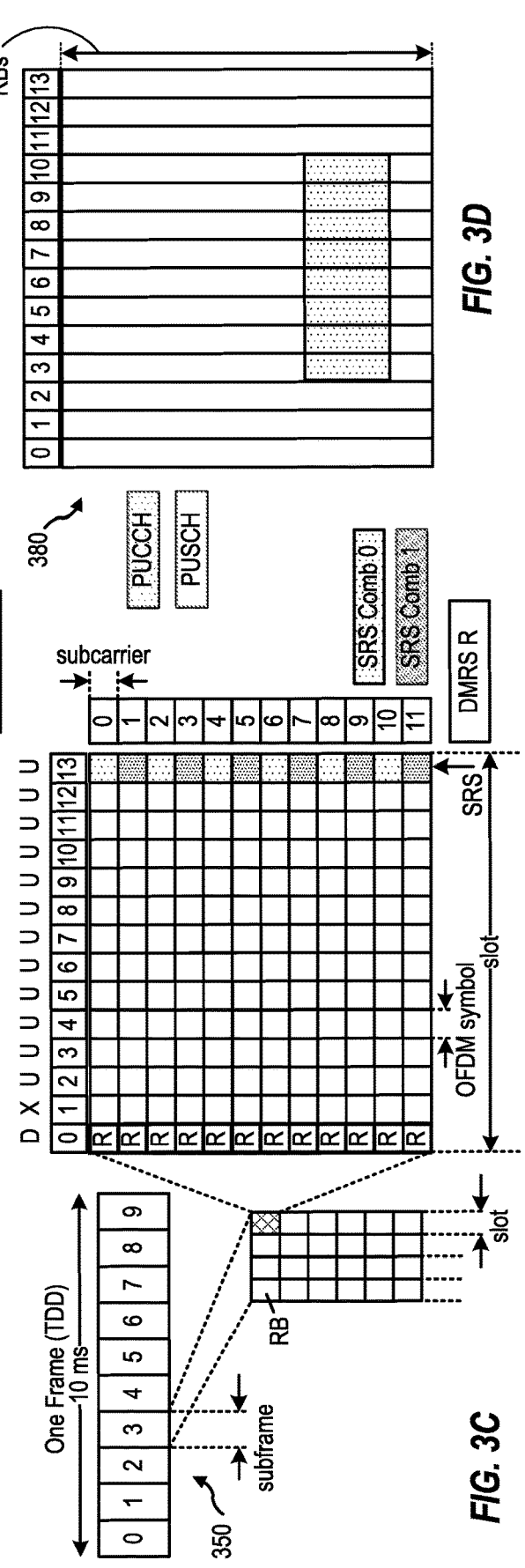
FIG. 3A  FIG. 3B  FIG. 3C  FIG. 3D

RANDOM ACCESS RESPONSE WINDOW START IN NON-TERRESTRIAL NETWORKS

CROSS-REFERENCE TO RELATED APPLICATION

The present Application for Patent claims priority to U.S. Provisional Application No. 63/250,609, filed Sep. 30, 2021, which is hereby expressly incorporated by reference herein in its entirety.

INTRODUCTION

Aspects of the present disclosure relate to wireless communications, and more particularly, to techniques for random access channel communications in non-terrestrial networks.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE). The method generally includes transmitting a physical random access channel (PRACH) preamble to a network entity in a random access (RA) occasion; and monitoring for a random access response (RAR) within a RAR window with a start position determined based at least in part on the RA occasion, round trip time parameters for non-terrestrial network communications, and one or more timing offset parameters.

One aspect provides a method of wireless communication by a network entity. The method generally includes receiving a physical random access channel (PRACH) preamble from a UE in a random access (RA) occasion; and transmitting a random access response (RAR) in a RAR window with a start position determined based at least in part on the RA occasion, a parameter indicative of a portion of a round trip time for non-terrestrial network communications, and one or more timing offset parameters.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for random access response (RAR) window start in non-terrestrial networks (NTNs).

Due to extended, varying propagation delays encountered with NTN communications, a user equipment (UE) and network (e.g., a radio access network) may be out-of-sync on when the UE will start monitoring for a RAR in the RAR window. For example, the network may transmit a RAR in a particular subframe where the network expects the RAR window to start, whereas the UE may expect the RAR window to start in a later subframe due to the propagation delay of the NTN communications. As used herein, the term "network" can refer to a wireless communication network, a radio access network, and/or a device in a radio access network, such as a base station or NTN.

Aspects of the present disclosure provide techniques and apparatus for determining the start of a RAR window that accounts for the round trip time (RTT) of NTN communications. For example, a RAR window may start at the subframe (or slot) that includes the end of the preamble transmission or last preamble repetition plus X' subframes (or slots), where the value X' may be determined according to a sum of a round trip time for NTN communications plus a maximum between zero and a difference of a first timing offset parameter (e.g., X as provided in Table 1) and a second timing offset parameter (e.g., a value signaled by the network). In certain cases, the value for the second timing offset parameter may be set to a value for a certain RTT (e.g., the shortest RTT) in the cell of an NTN or derived from a particular reference point within the coverage area.

The techniques and apparatus for determining the RAR window start described herein may facilitate the network to communicate with a UE via an NTN regardless of the varying RTTs across the coverage area of the NTN. The techniques and apparatus for determining the RAR window start described herein may enable desirable downlink performance for reception of the RAR, such as desirable latency, for example, due to the network devices at least considering the varying RTTs across the coverage area of the NTN to determine the RAR window start.

Introduction to Wireless Communication Networks

Figure 1:
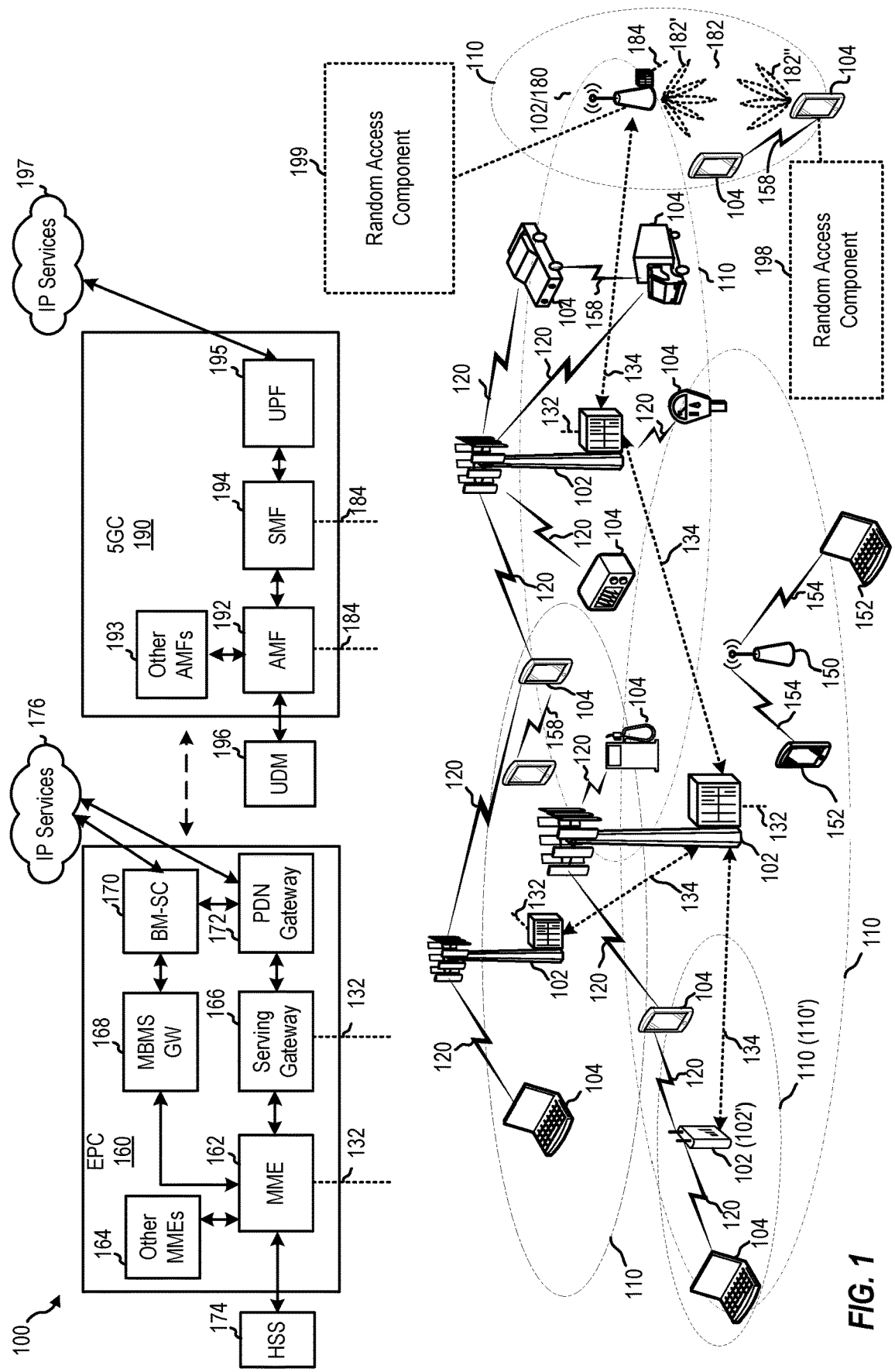
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes a random access component 199, which may be configured to determine a start position of a RAR window based at least in part on a round trip time for NTN communications. Wireless network 100 further includes random access component 198, which may be used configured to determine a start position of the RAR window based at least in part on the round trip time for NTN communications.

Figure 2:
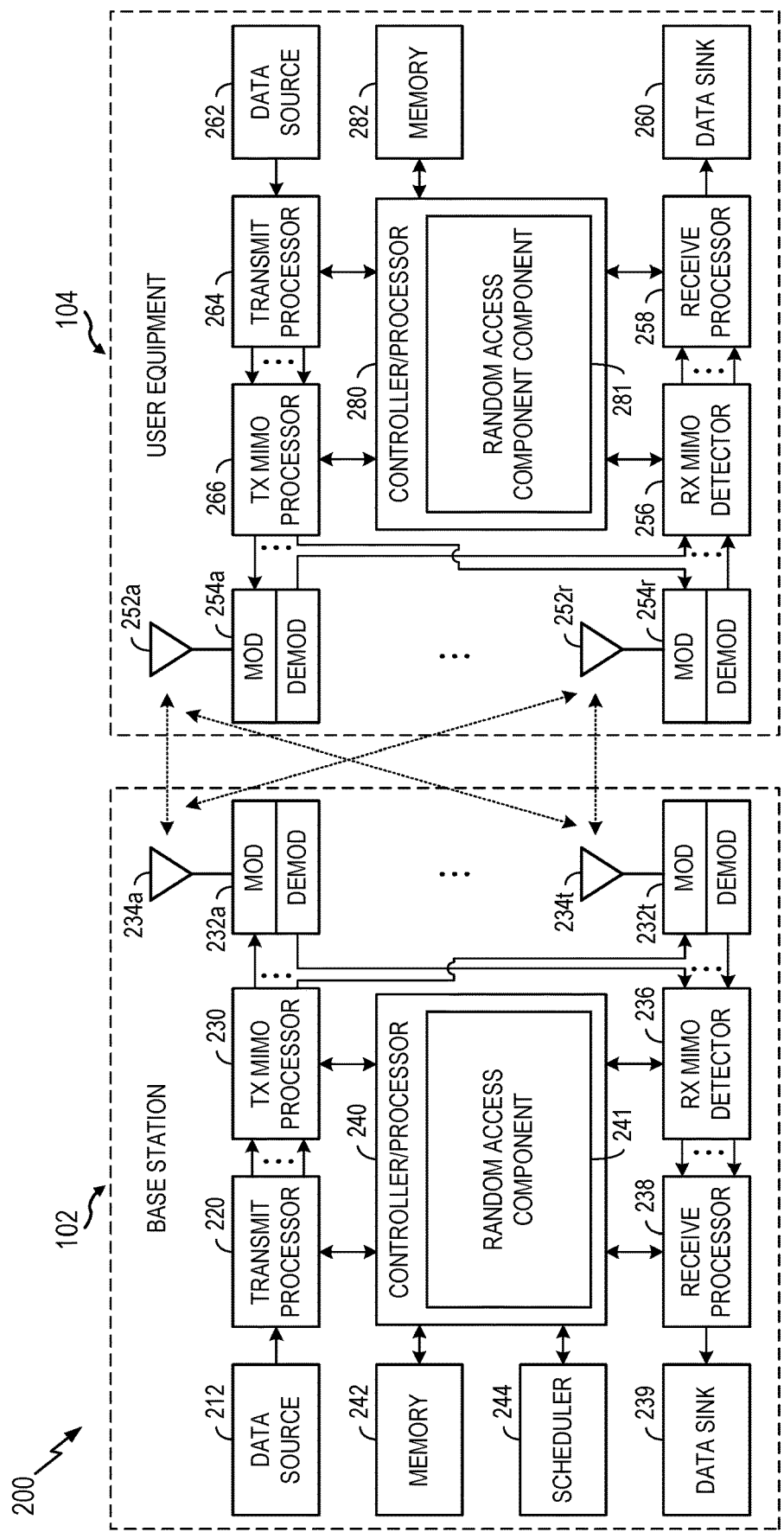
FIG. 2 is a block diagram conceptually illustrating aspects of an example of a base station and user equipment (UE).

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes random access component 241, which may be representative of random access component 199 of FIG. 1. Notably, while depicted as an aspect of controller/processor 240, random access component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes random access component 281, which may be representative of random access component 198 of FIG. 1. Notably, while depicted as an aspect of controller/processor 280, random access component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Narrowband Communications

Certain wireless communication systems (e.g., Evolved Universal Terrestrial Radio Access (E-UTRA) system and/or NR system) may enable access to network services using a physical layer configured for very low power consumption and low complexity, which may be beneficial for Internet-of-Things (IoT) devices operating on battery power. These low power network services may be referred to as narrowband IoT (NB-IoT) operations. Under NB-IoT operations, a UE may support data rates up to 68 kbps for downlink and up to 132 kbps for uplink, for example, via a full carrier bandwidth of 180-200 kHz and a subcarrier spacing of 3.75 kHz or 15 kHz. At such a low bandwidth, the NB-IoT may support a low complexity transceiver to enable a low cost solution for IoT devices. In certain cases, a UE may be equipped with only a single antenna to facilitate low power consumption. The low power consumption may enable an NB-IoT device to operate for at least 10 years on battery power. Those of skill in the art will understand that the parameters for configuring NB-IoT operations are exemplary only. Additional parameters or categories of parameters may be used in addition to or instead of those described.

Example Non-Terrestrial Network Communications

Figure 4:
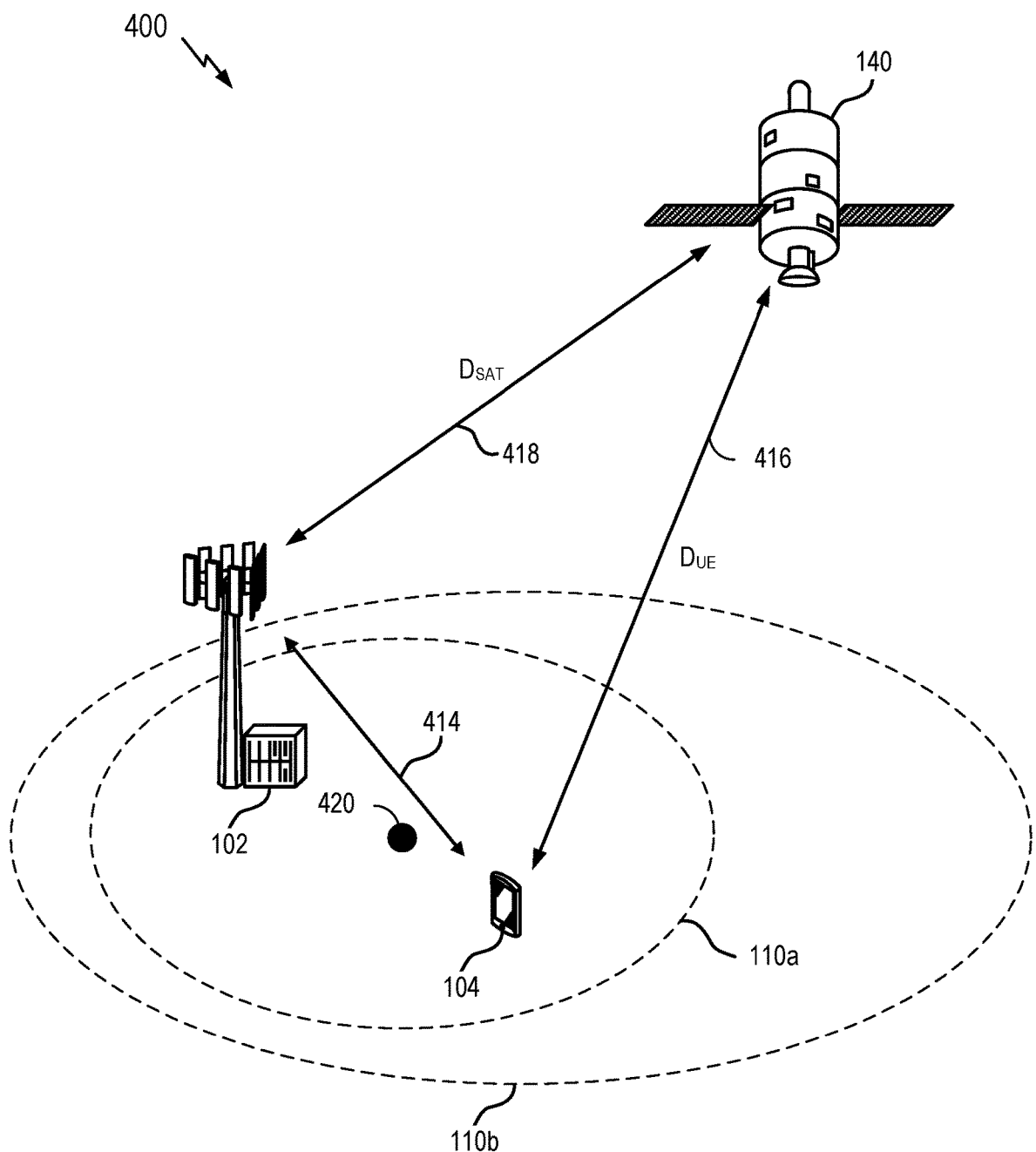
FIG. 4 illustrates an example of a wireless communications network including a non-terrestrial network (NTN) entity.

FIG. 4 illustrates an example of a wireless communications network 400 including a non-terrestrial network (NTN) entity 140 (which may be generally referred to as NTN 140), in which aspects of the present disclosure may be practiced. In some examples, the wireless communications network 400 may implement aspects of the wireless communication network 100. For example, the wireless communications network 400 may include BS 102, UE 104, and the non-terrestrial network entity 140, such as a satellite. BS 102 may serve a coverage area or cell 110a in cases of a terrestrial network, and non-terrestrial network entity 140 may serve the coverage area 110b in cases of a non-terrestrial network (NTN). Some NTNs may employ airborne platforms (e.g., a drone or balloon) and/or spaceborne platforms (e.g., a satellite).

The non-terrestrial network entity 140 may communicate with the BS 102 and UE 104 as part of wireless communications in an NTN. In cases of a terrestrial network, the UE 104 may communicate with the BS 102 over a communication link 414. In the case of NTN wireless communications, the non-terrestrial network entity 140 may be a serving cell for the UE 104 via a communication link 416. In certain aspects, the non-terrestrial network entity 140 may act as a relay (or a remote radio head) for the BS 102 and the UE 104. For example, the BS 102 may communicate with the non-terrestrial network entity 140 via a communication link 418, and the non-terrestrial network entity may relay signaling between the BS 102 and UE 104 via the communication links 416, 418.

In cases where the NTN relays signaling between the BS and UE, the propagation delay between the BS 102 and UE 104 may include the delay ($D_{UE}$) between the UE 104 and the NTN 140 and the delay ($D_{SAT}$) between the NTN 140 and the BS 102. If the NTN serves as a base station, the propagation delay may include the delay $D_{UE}$ between the UE 104 and the NTN 140.

The UE may be able to estimate the duration of the delay $D_{UE}$, for example, with a global navigation satellite system. In certain cases, the UE may not know the duration of delay $D_{SAT}$, for example, due to variations in the speed of the satellite or handover of a feeder link. Although the network may signal a value for the delay $D_{SAT}$ to the UE, the network may not be aware of the value of the delay $D_{UE}$. Due to the network not knowing the delay $D_{UE}$, the UE and network may be out-of-sync with respect to when to expect the reception of certain messages, such as a random access response, as further described herein.

The round-trip time (RTT) between the UE and BS via an NTN can be given by the sum of the timing advance (TA) of the UE and a parameter ($K_{mac}$) indicative of a portion of the RTT between the NTN and BS. The RTT between the UE and BS via an NTN may be 25 milliseconds (ms), 40 ms, 500 ms, for example. The RTT between the NTN and BS may be equal to the sum of a common TA value and the $K_{mac}$ value. In certain aspects, the $K_{mac}$ value may be provided to the UE by the network. The $K_{mac}$ value may represent the difference between downlink time or logical uplink time and actual uplink time at the network side. The UE's TA may be given by the sum of a UE-specific TA value and the common TA value. As an example, before transmission of certain messages (e.g., MSG1 and MSGA, as further described herein) for NTN communications, the UE may calculate its TA as follows:

$$TA = (N_{TA} + N_{TA,UE\text{-}specific} + N_{TA,common} + N_{TA,offset}) \times T_c \qquad (1)$$

where $N_{TA}$ may be specified as 0 for PRACH and updated based on a TA Command field in MSG2/MSGB via medium access control (MAC) signaling (such as a MAC control element (CE) TA command); $N_{TA,UE\text{-}specific}$ may be derived from the UE-specific TA self-estimation to pre-compensate for the service link delay; $N_{TA,common}$ may be a network-controlled common TA and may include any timing offset used by the network; $N_{TA,offset}$ is a fixed offset used to calculate the timing advance, where $N_{TA,offset}$ may be specified in certain standards for wireless communications (e.g., Technical Specification (TS) 38.213 of the 3rd Generation Partnership Project (3GPP)); and $T_c$ may be specified in TS 38.211 of the 3GPP, for example.

Example Random Access Channel Communications

Figure 5A:
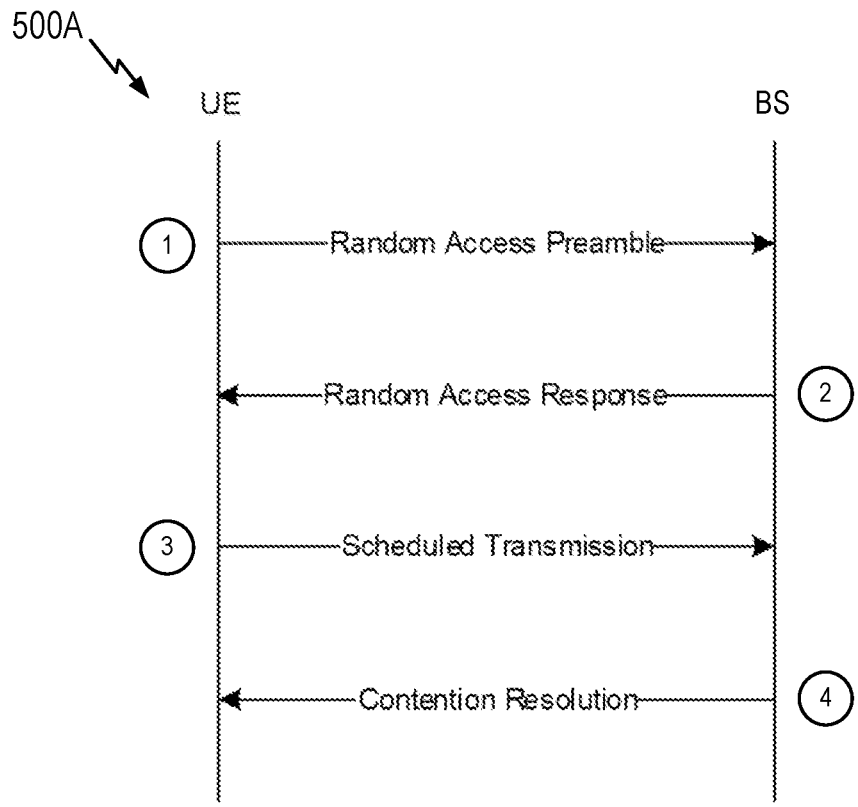
FIGS. 5A and 5B illustrate example random access channel (RACH) procedures.

In various scenarios, a UE may communicate with a network entity (such as a base station) via a random access channel (RACH) procedure. For example, the UE may use a RACH procedure for initial radio resource control (RRC) connection setup, RRC connection re-establishment, a handover scenario, a scheduling request failure, beam recovery, downlink or uplink data arrival, etc. FIG. 5A illustrates an example four-step RACH procedure 500A, in accordance with certain aspects of the present disclosure. In a first message (MSG1), the UE transmits a random access (RA) preamble to the BS. The UE may monitor for a response from the BS within a configured time window (e.g., a RAR window). The UE may receive the random access response (RAR) from the BS, where the RAR may include uplink scheduling for the UE. Upon reception of the RAR, the UE sends a third message (MSG3) using the uplink grant scheduled in the response and monitors for contention resolution. If contention resolution is not successful after the MSG3 transmission and/or retransmission(s) of MSG3, the UE may go back to MSG1 transmission.

Figure 5B:
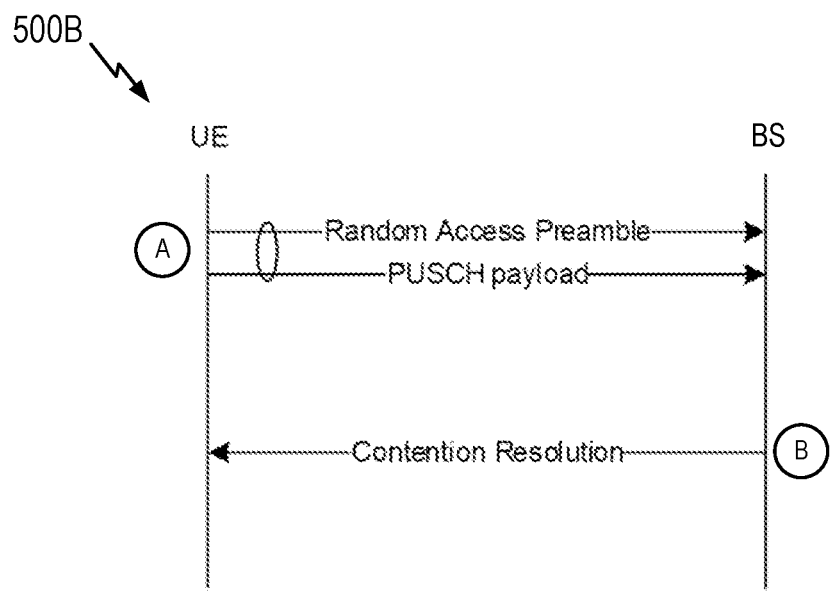

FIG. 5B illustrates an example of a two-step RACH procedure 500B, where contention resolution is successful at the BS, in accordance with certain aspects of the present disclosure. The UE may transmit in a first message (MSGA) including a preamble on a physical random access channel (PRACH) and a payload on a PUSCH. After the MSGA transmission, the UE monitors for a RAR from the BS within a configured time window (e.g., a RAR window). If contention resolution is successful upon receiving the network response (MSGB), the UE ends the random access procedure, and in certain cases, the UE may communicate with the BS in a connected state. FIGS. 5A and 5B illustrate examples of contention-based random access (CBRA) procedures to facilitate understanding. Aspects of the present disclosure may also apply to contention-free random access (CFRA) procedures, where the network may initially provide a RA preamble and/or uplink resource assignment to the UE.

Figure 6:
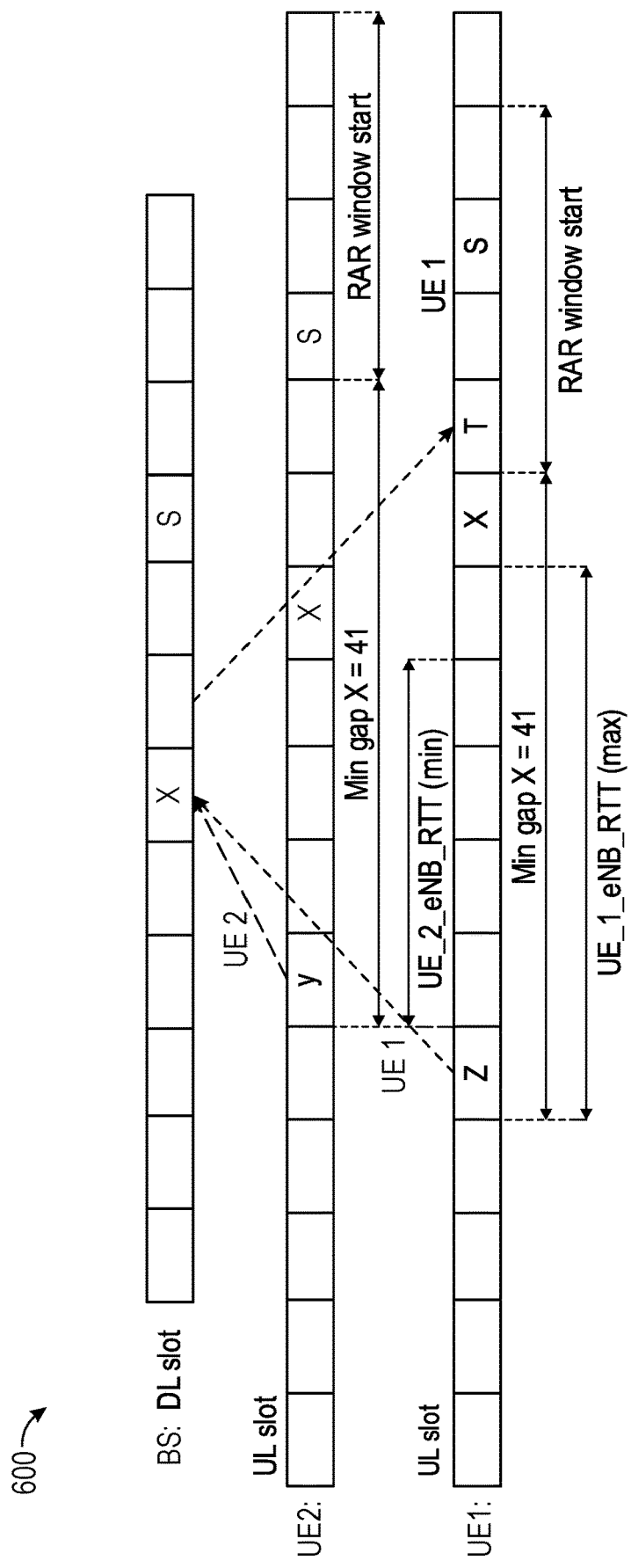
FIG. 6 depicts example timing diagrams of preamble transmissions and the start position of random access response (RAR) windows.

Due to the extended, varying propagation delays encountered with NTN communications, the UE and network may be out-of-sync on when the UE will start monitoring for a RAR in the RAR window. For example, FIG. 6 depicts example timing diagrams 600 of preamble transmissions and the start position of RAR windows for UE1 and UE2 in NTN communications. As shown, UE1 may transmit the preamble in slot Z for the preamble to arrive at the BS (e.g., BS 102 in FIG. 4) in slot X via an NTN, for example, as depicted in FIG. 4. UE2 may transmit the preamble in slot Y for the preamble to also arrive at the BS in slot X via an NTN. In this example, UE2 may be located closer to the NTN than UE1 to enable a shorter propagation delay $D_{UE}$, which will allow UE2 to transmit the preamble at a later slot (e.g., slot Y) compared to UE1 for both preambles to arrive in slot X. In certain cases (e.g., for NB-IoT devices), UE1 and UE2 may be configured to start monitoring for the RAR after a certain duration (e.g., X subframes or slots) after the preamble. For example, UE1 may start monitoring for the RAR in slot T, and UE2 may start monitoring for the RAR in slot S. The network may assume that the $D_{UE}$ for UE1 and UE2 may be equal to the propagation delay between UE1 and the NTN. Under such an assumption, the network may expect UE1 and UE2 to start monitoring for the RAR in slot T, such that UE2 may miss the RAR from the network if UE2 expects to start monitoring in slot S.

If the UE is an NB-IoT UE, the RAR window may start at the subframe that contains the end of the last preamble repetition plus X subframes (or slots) and has a specified length for the corresponding enhanced coverage level, where value X may be determined from Table 1 based on the used preamble format and the number of narrowband PRACH (NPRACH) repetitions.

TABLE 1

| TDD/FDD mode | Preamble format | Number of NPRACH repetitions | X |
|---|---|---|---|
| FDD | 0 or 1 | >=64 | 41 |
| FDD | 0 or 1 | <64 | 4 |
| FDD | 2 | >=16 | 41 |
| FDD | 2 | <16 | 4 |
| TDD | Any | Any | 4 |

In case of low earth orbit (LEO)-based NTNs, the RTT can be less than the value of X. For example, an RTT of 25 ms for NTN communications is less than where X=41 ms. In such cases, the offset to start the RAR window may be less than, greater than, or equal to the value of X. For NTN communications, the start of the RAR window could be defined as the end of the last preamble repetition plus the sum of X and the RTT in terms of subframes (or slots) or the end of the last preamble repetition plus the maximum of X and the RTT in terms of subframes (or slots). With either of these approaches, different UEs will start the RAR window at different times because different UEs at different location within the NTN cell will calculate different values of $D_{UE}$. This will result in the network and UE being out-of-sync on the starting point of the RAR.

Accordingly, what is needed are techniques and apparatus for determining the start of a RAR window that accounts for the RTT of NTN communications.

Aspects Related to Determining a Start of a RAR Window in NTN Communications

Aspects of the present disclosure provide techniques and apparatus for determining the start of a RAR window that accounts for or considers the RTT of NTN communications. For example, RA Response window may start at the subframe (or slot) that includes the end of the preamble transmission or last preamble repetition plus X' subframes (or slots), where the value X' may be determined according to a sum of a round trip time for NTN communications plus a maximum between zero and a difference of a first timing offset parameter (e.g., X as provided in Table 1) and a second timing offset parameter (e.g., a value signaled by the network). In certain cases, the value for the second timing offset parameter may be set to a value for a minimum RTT in the cell of an NTN. In certain aspects, the techniques and apparatus for determining the RAR window start described herein may be specific to NB-IoT communications and/or other narrowband or low complexity devices, such as Reduced Capability devices under 5G NR systems. The NB-IoT devices and/or low complexity devices may use an extended offset (e.g., at least 41 subframes or slots) between the preamble transmission and RAR window, for example, due to long repetitions of the preamble, where the offset may be used to maintain synchronization between the UE and the network.

The techniques and apparatus for determining the RAR window start described herein may facilitate the network to communicate with a UE via an NTN regardless of the varying RTTs across the coverage area of the NTN. The techniques and apparatus for determining the RAR window start described herein may enable desirable downlink performance for reception of the RAR, such as desirable latency, due to the RAR window start at least considering the varying RTTs across the coverage area of the NTN.

Figure 7:
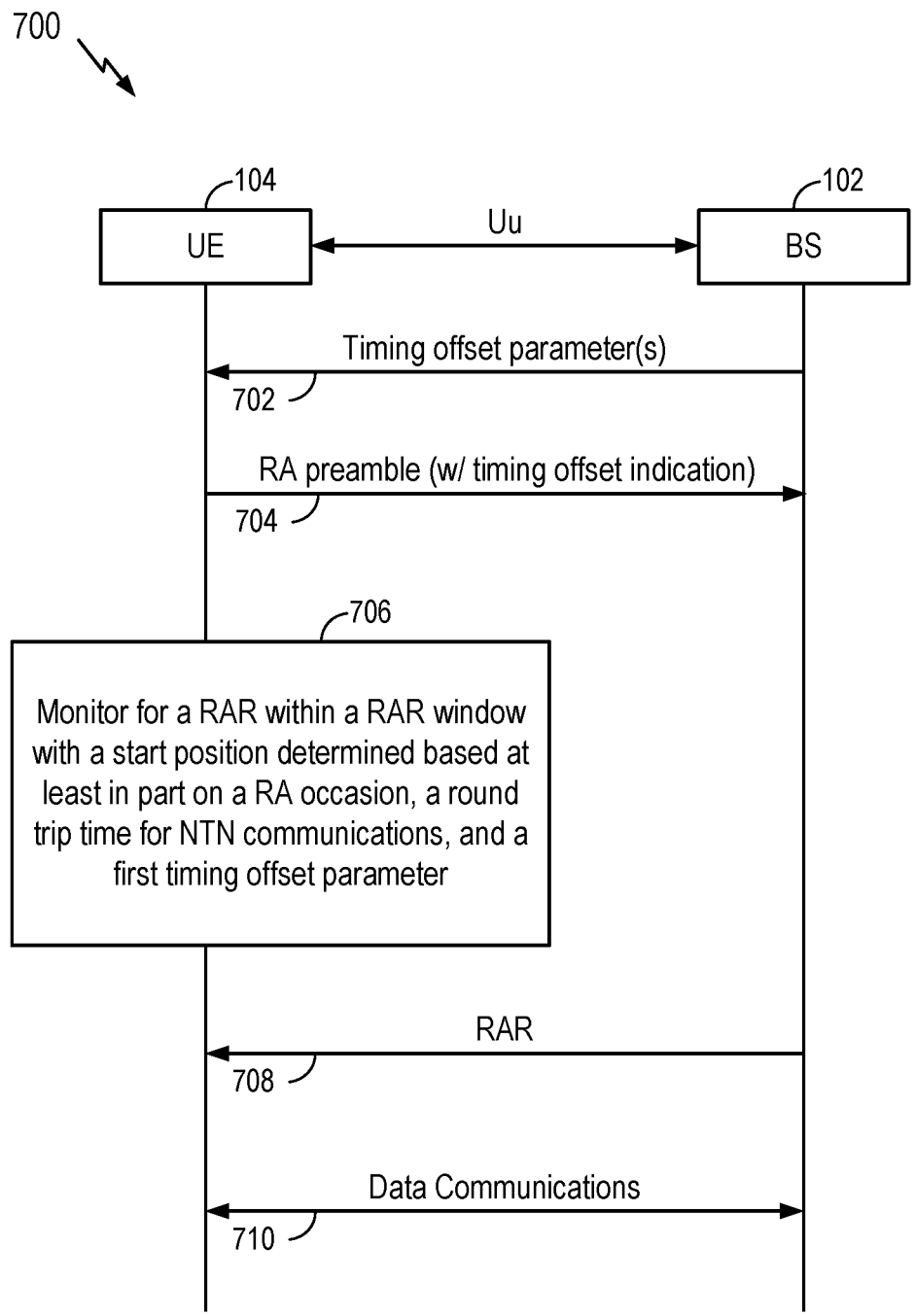
FIG. 7 depicts an example signaling flow for determining the start of a RAR window for NTN communications.

FIG. 7 depicts an example signaling flow 700 for determining the start of a RAR window for NTN communications. In this example, the BS 102 may include an NTN (e.g., the NTN 140) in communication with a base station (e.g., the BS 102), for example, as depicted in FIG. 4.

Optionally, at step 702, the UE 104 may receive, from the BS 102, signaling indicating one or more timing offset parameters for determining the start position of a RAR window. For example, the timing offset parameters may include a first timing offset parameter, which is representative of the value X as described herein with respect to Table 1, and a second offset timing offset parameter, which may be used to adjust the value X, as further described herein. In certain aspects, the first timing offset parameter may be preconfigured, for example, as specified in Table 1, such that the first timing offset parameter is not signaled to the UE (e.g., not configured by the BS 102). The first timing offset parameter may specified as a minimum gap used between the transmission of the last repetition of the preamble and the start position of the RAR window to maintain synchronization between the UE and network. In certain aspects, at step 702, the UE 104 may also receive signaling indicating one or more parameters for determining the RTT for NTN communications and/or the UE's TA value, such as the value $K_{mac}$ and common TA value. The signaling at step 702 may be provided via one or more transmissions using various signaling, such as radio resource control (RRC) signaling, medium access control (MAC) signaling, downlink control information (DCI), and/or system information.

At step 704, the UE 104 may transmit, to the BS 102, a PRACH preamble in a RA occasion, for example, according to a RACH resource periodicity. Preamble transmissions can take place within certain periodic RACH resources (e.g., time domain and frequency domain resources). From the UE perspective, the RA occasion may include (or correspond to) the transmission of the preamble or the transmission of the last repetition of the preamble, for example, in coverage enhancement applications for NB-IoT devices, where the UE 104 may transmit multiple repetitions (e.g., 64 repetitions) of the preamble. In certain cases, the preamble may provide an indication of the value set for the second timing offset parameter, as further described herein. For example, in cases where the UE selects or determines the value for the second timing offset parameter, the preamble may be used to indicate the UE's selected value for the second timing offset parameter. The indication of the value for the second timing offset parameter may be implicitly or explicitly provided via the preamble. As an example, a first set of RACH resources for the preamble may be associated with a first value for the second timing offset parameter, and a second set of RACH resources for the preamble may be associated with a second value for the second timing offset parameter.

At step 706, the UE 104 may monitor for a RAR within a RAR window with a start position determined based at least in part on a RA occasion (e.g., the RA occasion used at step 704), the RTT for NTN communications, the first timing offset parameter, and/or the second timing offset parameter, as further described herein. For example, the RAR window may start at the subframe (or slot) that includes the end of the preamble transmission or last preamble repetition (at step 704) plus X' subframes (or slots), where the value X' may be determined according to the following expression:

$$X'=RTT_{UE\text{-}BS}+\max(X-\text{Offset}_X, 0) \quad (2)$$

where $RTT_{UE\text{-}BS}$ may be the round trip time for NTN communications (e.g., the sum of the UE's TA and $K_{mac}$, as described herein); X is the first timing offset parameter, for example, as provided in Table 1 for NB-IoT devices or other low complexity devices; and $\text{Offset}_X$ is the second timing offset parameter (e.g., a value signaled by the network or determined by the UE), which may have a value that is less than, greater than, or equal to X, for example. The function max may provide the greatest value or largest value among a set of values. The second timing offset parameter may be used to provide an adjustable timing offset for the varying RTTs across the cell coverage of an NTN.

At step 708, the UE 104 may receive, from the BS 102, the RAR within the RAR window, which has the start position determined as further described herein. As an example, the RAR may provide DCI scheduling further communications between the UE 104 and BS 102.

At step 710, the UE 104 may communicate with the BS 102, for example, according to the DCI received in the RAR at step 708. For example, the UE 104 may transmit uplink data to the BS 102 at step 710 or receive downlink data from the BS 102 at step 710.

Figure 8:
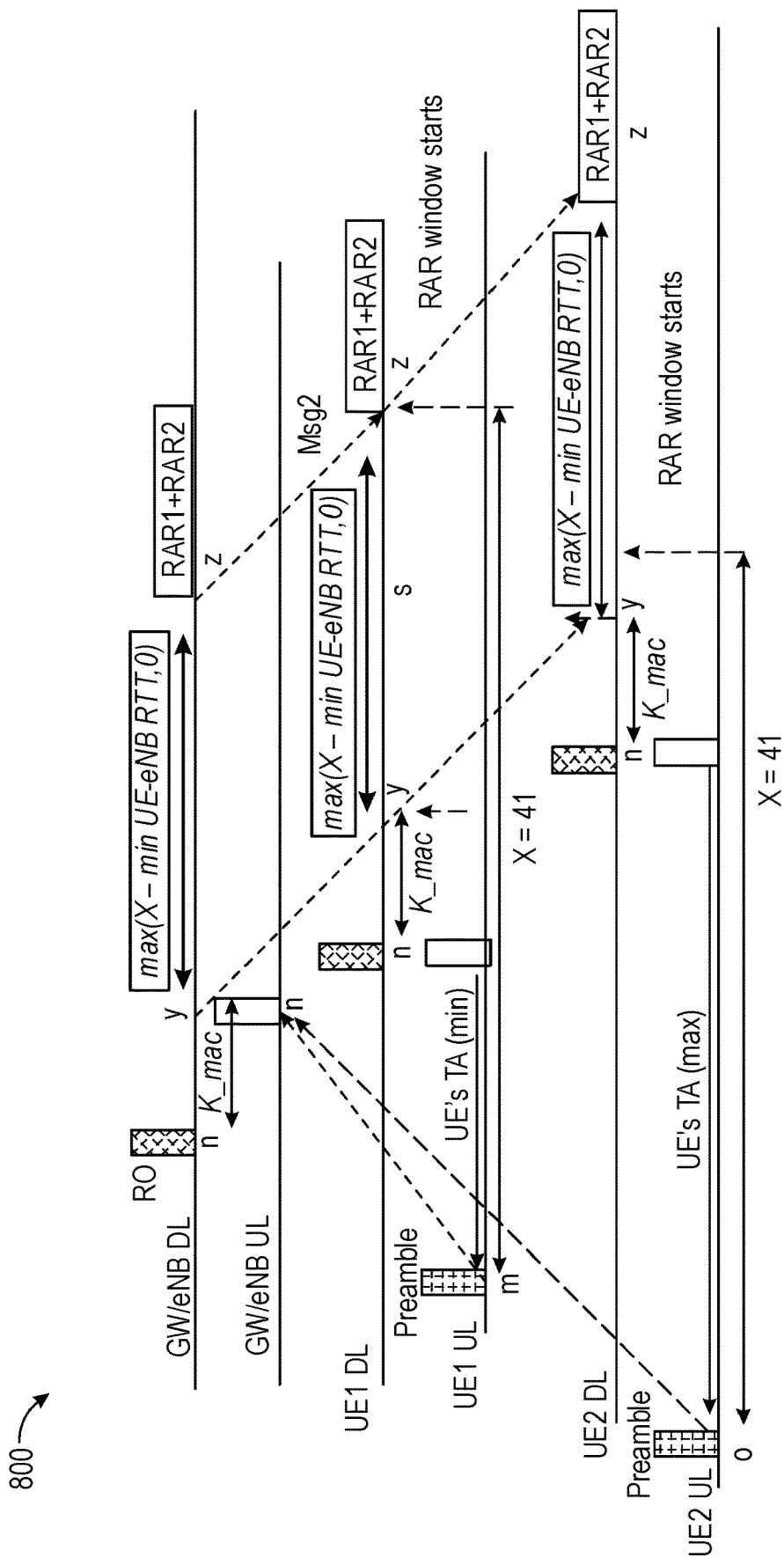
FIG. 8 depicts example timing diagrams of preamble transmissions and the start position of RAR windows for NTN communications.

FIG. 8 depicts example timing diagrams of preamble transmissions and the start position of RAR windows for UE1 and UE2 in NTN communications. In this example, UE1 may be located closer to the NTN than UE2 to provide a shorter propagation delay between UE1 and the NTN compared to the propagation delay for UE2. UE1 may transmit a preamble in slot m, such that the preamble arrives at the BS via an NTN in slot n. UE2 may transmit a preamble in slot o, such that the preamble arrives at the BS via the NTN in slot n. In certain aspects, UE1 and UE2 may determine the value X' according to Expression (2). As an example, UE1 and U2 may be configured with a value for the second timing offset parameter ($\text{Offset}_X$) that equals a minimum RTT between a UE and BS within the coverage area of the NTN ($RTT_{minUE\text{-}eNB}$). The value for $RTT_{minUE\text{-}eNB}$ may be equal to or greater than the value for X, such that the $\max(X-\text{Offset}_X, 0)$ will equal zero. The value for $RTT_{UE\text{-}BS}$ for UE1 may be equal to 41 slots (or subframes), which may be the same value for X The value for $RTT_{UE\text{-}BS}$ for UE2 may be greater than the value for X. UE1 and UE2 may monitor for the RAR in the same RAR window starting in slot z in the respective timelines. The timing offsets described herein may enable UE1 and UE2 to monitor for a RAR in the same RAR window despite having differing RTTs for NTN communications.

Figure 9:
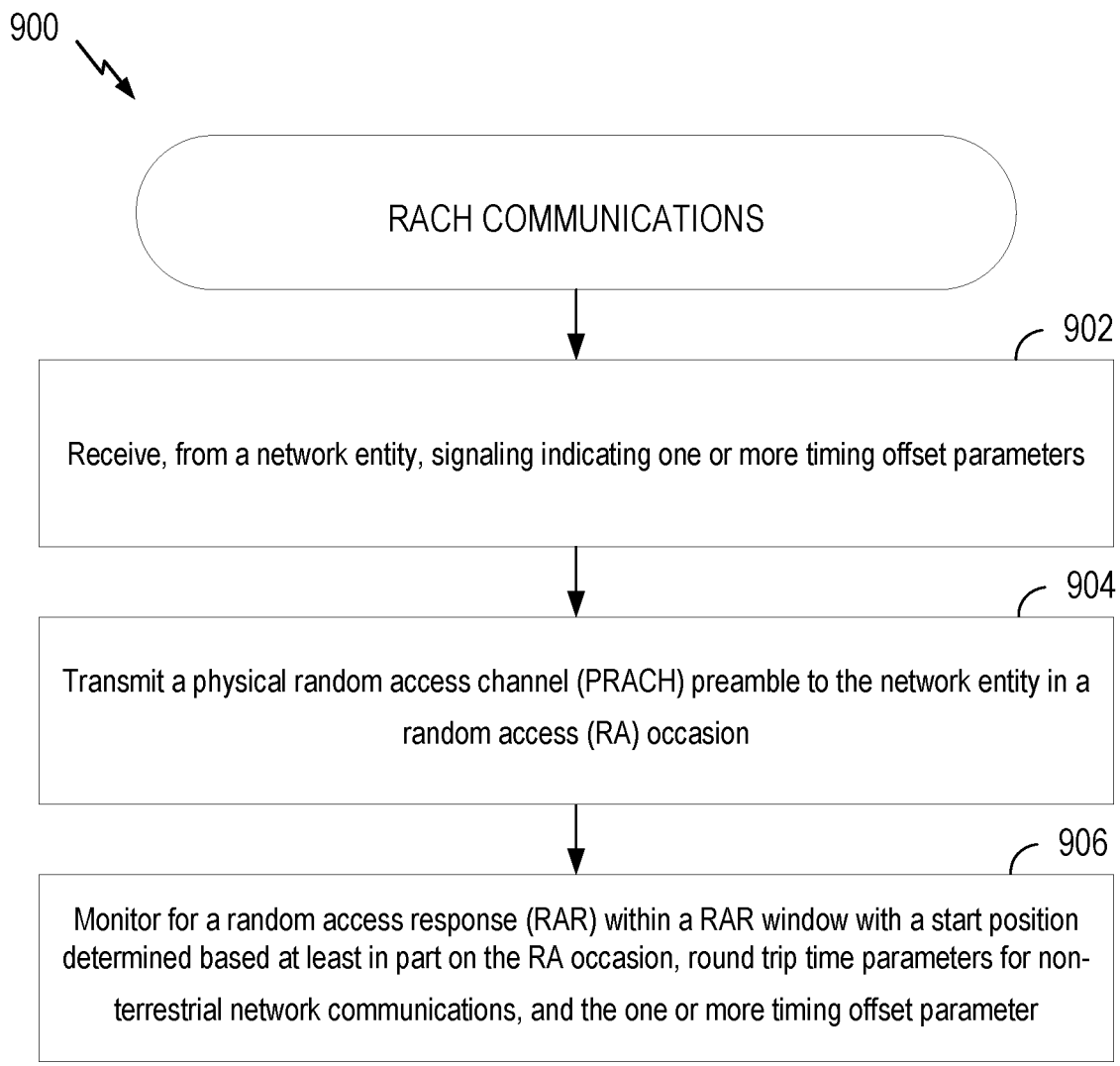
FIG. 9 depicts an example method for communicating via a RACH procedure for NTN communications by a UE.

FIG. 9 depicts an example method 900 for communicating via a RACH procedure for NTN communications, for example, by a UE. The method 900 may optionally begin, at step 902, where a UE (e.g., the UE 104) may receive, from a network entity (e.g., the BS 102 via the NTN 140), signaling indicating one or more timing offset parameters (e.g., a value for $Offset_X$). The one or more timing offset parameters may include the first timing offset parameter, the second timing offset parameter, and/or other parameters related to determining the RTT and/or TA for NTN communications, such as the common TA value, $K_{mac}$, and/or other parameters in Expression (1). The UE may receive signaling indicating the value(s) for the first timing offset parameter and/or the second timing offset parameter, for example, as described herein with respect to FIG. 7.

At step 904, the UE may transmit a PRACH preamble to the network entity in an RA occasion. For example, the UE may be configured with periodic RA occasions, and the UE may transmit the PRACH preamble in one of the RA occasions according to the configured periodicity. In certain aspects, the RA occasion may include the transmission of the preamble or the transmission of the last repetition of the preamble. The RA occasion may correspond to or represent the subframe or slot in which the preamble or the last repetition of the preamble is transmitted.

At step 906, the UE may monitor for a RAR within a RAR window with a start position (with respect to the time domain) determined based at least in part on the RA occasion, round trip time parameters for NTN communications (or the RTT for NTN communications), and the one or more timing offset parameters. The RTT parameters may include parameters used to determine or estimate the RTT for NTN communications, such as the TA and $K_{mac}$, where the TA may be determined according to Expression (1), for example. The RA occasion may provide a start position for a duration (e.g., X') between transmission of the preamble in the RA occasion and the RAR window. The duration between the RA occasion and the start position of the RAR window may be determined based at least in part on the round trip time, the first timing offset parameter, and the second timing offset parameter (e.g., $Offset_X$). For example, the UE may determine the duration between the RA occasion and the RAR window according to Expression (2) as described herein. The duration may include the round trip time, which may be derived from the RTT parameters, plus a greatest value among (e.g., a maximum of) zero and a difference of the first timing offset parameter and the second timing offset parameter. If the difference equals zero, the greatest value among zero and the difference may be considered to be zero. In general, the greatest value among a set of values that are equal may be considered to be the equal value for the set of values.

For certain aspects, the second timing offset parameter may be set to a particular value. For example, the second timing offset parameter may be set to a value representative of a certain RTT between a UE and BS in the coverage area (e.g., the coverage area 110b) of an NTN, such as the shortest or minimum RTT in the coverage area for a given NTN. The minimum RTT for an NTN may be achieved by the UE closest to the satellite in the coverage area. The second timing offset parameter may include a value indicative of a certain RTT (e.g., the minimum RTT) in a cell for NTN communications.

In certain aspects, the second timing offset parameter may be derived using a reference point (e.g., a particular location) in the coverage area of the NTN. Referring to FIG. 4, the UE may be provided the location of a reference point 420 (e.g., geographic coordinates) in the coverage area 110b of the NTN 140. Based on the location of the reference point, the UE may determine an estimate for the RTT for the NTN at the reference point and use the estimated RTT as the value for the second timing offset parameter. The reference point may be located at the beam center (e.g., the centroid of the coverage area) of the NTN, for example, at a particular time (e.g., where system frame number (SNF)=0 or at a particular time of day).

According to certain aspects, the UE may obtain multiple values for the second timing offset parameter, where the UE selects one of the values and indicates to the network the selected value. The UE may select a value for the second timing offset parameter from a plurality of values based at least in part on the round trip time, which may be encountered or calculated by the UE. The UE may signal, to the network entity, an indication of the value selected for the second timing offset parameter, for example, via transmission of the PRACH preamble. In certain cases, the UE may determine a value for the second timing offset parameter (e.g., a UE-specific value) and signal the value to the network entity.

As an example, the network may provide the UE with two values for the second timing offset parameter, where the first value is representative of the shortest RTT in the coverage area of the NTN, and the second value is representative of the longest RTT in the coverage area of the NTN. In certain cases, the network may provide more than two values for the second timing offset parameter. The network may provide the values for the second timing offset parameter via RRC signaling, DCI, MAC signaling, and/or system information at step 902.

The UE may indicate its selected value for the second timing offset parameter via the preamble transmission. As an example, a UE with the longest RTT can choose a PRACH resource associated with the longest RTT to send MSG1, for example, in RACH procedure 500A, and indicate the value for the second timing offset parameter to the network. A UE with the shortest RTT can choose a PRACH resource associated with the shortest RTT to send MSG1 and indicate the value for the second timing offset parameter to the network. Allowing the UE to select the value for the second timing offset parameter may be beneficial for UEs with the longest RTT to avoid waiting an extended period to start the RAR. An adaptive value for the second timing offset parameter at the UE may enable desirable latencies for the RAR.

Certain preamble sequences and/or RACH resources for the preamble may be associated with particular values for the second timing offset parameter. A first range of preamble sequences may be associated with a first value for the second timing offset parameter (e.g., the shortest RTT of the NTN), and a second range of preamble sequences may be associated with a second value for the second timing offset parameter (e.g., the longest RTT of the NTN). In certain cases, a first set of RACH resources may be associated with a first value for the second timing offset parameter, and a second set of RACH resource may be associated with a second value for the second timing offset parameter.

In certain aspects, the duration between the RA occasion and the start point may be determined based at least in part on parameters related to the RTT between the UE and BS, such as the UE's TA, the common TA, and/or the $K_{mac}$ value. For example, the RAR window may start at the subframe (or slot) that includes the end of the preamble transmission or last preamble repetition (at step 704) plus X' subframes (or slots), where the value X' may be determined according to the following expression:

$$X' = TA + \max(K_{mac}, X) \tag{3}$$

where the TA value is the timing advance derived from the UE's estimation and common TA parameters, for example, as described herein with respect to Expression (1); $K_{mac}$ is indicative of a portion of the RTT between the UE and BS via an NTN; and X is the first timing offset parameter, for example, as provided in Table 1 for NB-IoT devices or other low complexity devices. The duration (e.g., X') between the RA occasion and the start point may include a timing advance associated with the UE (e.g., the TA determined according to Expression (1)) plus a greatest value among the first timing offset parameter (e.g., X) and a parameter indicative of a portion of the round trip time (e.g., $K_{mac}$).

For certain aspects, the value X' may be determined according to the following expression:

$$X'=TA_{UE}+\max(TA_{common}+K_{mac}, X) \qquad (4)$$

where $TA_{UE}$ is derived from the UE-specific TA self-estimation; $TS_{common}$ is the common timing offset value; $K_{mac}$ is indicative of a portion of the RTT between the UE and BS via an NTN; and X is the first timing offset parameter, for example, as provided in Table 1 for NB-IoT devices or other low complexity devices. The duration (X') between the RA occasion and the start position of the RAR window may include a timing advance associated with a service link of the UE (e.g., the UE-specific TA self-estimation) plus a greatest value among the first timing offset parameter and a sum of a common timing advance parameter (e.g., $TA_{common}$) and a parameter indicative of a portion of the round trip time (e.g., $K_{mac}$).

In certain aspects, the UE may be configured with value(s) for the second timing offset parameter and/or other parameters described herein, such as the common TA value and/or $K_{mac}$ value. For example, the UE may receive signaling indicating the value for the second timing offset parameter via RRC signaling, MAC signaling, DCI, and/or system information. At step 902, the UE may receive signaling indicating the first timing offset parameter and/or the second timing offset parameter via at least one of DCI, RRC signaling, MAC signaling, or system information. For certain aspects, the UE may use a default value for the second timing offset parameter if a value for the second timing offset parameter is not signaled to the UE (e.g., not configured by a network entity, such as a BS). The UE may set a value for the second timing offset parameter to be equal to the first timing offset parameter if the value for the second timing offset parameter is not signaled to the UE. As an example, the UE may assume the value for the second timing offset parameter is the same as the value for the first timing offset parameter, if the value for the second timing offset parameter is not signaled to the UE, for example, by the network. Such a default value for the second timing offset parameter may be used for geostationary orbit (GEO)-based NTNs, or where the RTT between the UE and BS is greater that the first timing offset parameter.

Figure 10:
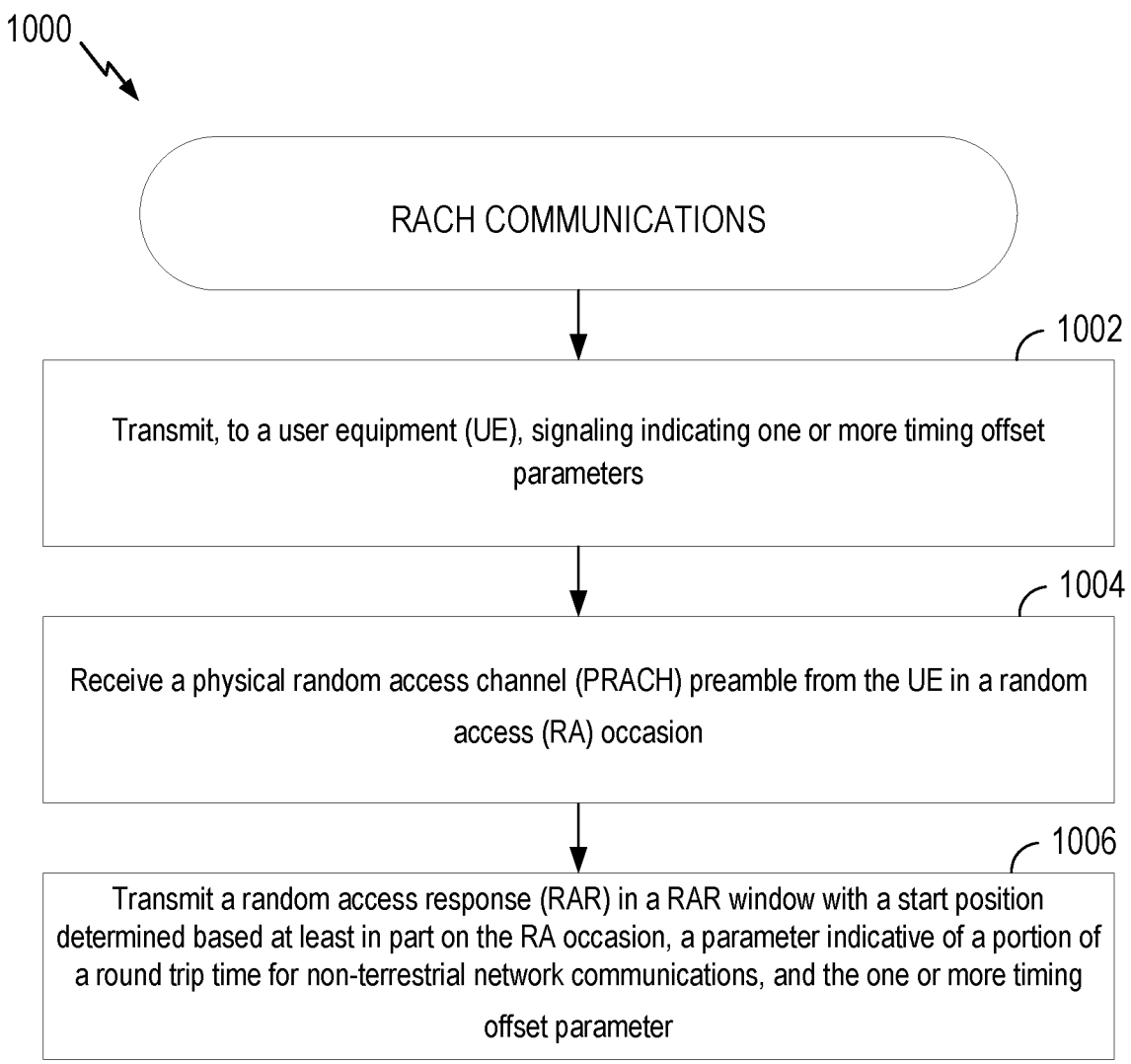
FIG. 10 depicts an example method for communicating via a RACH procedure for NTN communications by a network entity.

FIG. 10 depicts an example method 1000 for communicating via a RACH procedure for NTN communications, for example, by a network entity. The method 1000 may optionally begin, at step 1002, where the network entity (e.g., the BS 102 via the NTN 140) may transmit, to a UE (e.g., the UE 104), signaling indicating one or more timing offset parameters (e.g., a value for $Offset_X$). For example, the network entity may transmit signaling indicating the value(s) for the first timing offset parameter and/or the second timing offset parameter, for example, as described herein with respect to FIG. 7. As used herein, a network entity may refer to a wireless communication device in a radio access network, such as a base station, a remote radio head or antenna panel in communication with a base station, a non-terrestrial network, a core network, and/or a network controller.

At step 1004, the network entity may receive a PRACH preamble from the UE in a RA occasion. For example, the UE may be configured with periodic RA occasions, and the network entity may receive the PRACH preamble in one of the RA occasions according to the configured periodicity.

At step 1006, the network entity may transmit a RAR in a RAR window with a start position determined based at least in part on the RA occasion, a parameter indicative of a portion of the RTT for NTN communications (or a portion of the RTT for NTN communications), and the one or more timing offset parameters. The RA occasion may provide a start position for a duration between the preamble and the RAR window. For the network entity, the start position for the RAR window may be determined with reference to the downlink subframe (or slot) associated with the RA occasion, for example, in slot X in FIG. 6 or slot n in FIG. 8.

The duration between the RA occasion and the start position of the RAR window may be determined based at least in part on the parameter indicative of the portion of the round trip time (e.g., $K_{mac}$), the first timing offset parameter, and the second timing offset parameter (e.g., $Offset_X$). For example, the network entity may determine the duration between the RA occasion and the RAR window in terms of subframes (or slots) according to the following expression:

$$X'=K_{mac}+\max(X-Offset_X, 0) \qquad (5)$$

where $K_{mac}$, X, and $Offset_X$ represent the parameters described herein with respect to the other expressions, such as Expression (2). The duration may include a parameter indicative of a portion of the round trip time (e.g., $K_{mac}$) plus a greatest value among zero and a difference of the first timing offset parameter and the second timing offset parameter.

For certain aspects, the second timing offset parameter may be set to a particular value, for example, as described herein with respect to the method 900. The second timing offset parameter may be set to a value representative of a certain RTT between a UE and BS in the coverage area (e.g., the coverage area 110b) of an NTN, such as the shortest or minimum RTT in the coverage area for a given NTN. The second timing offset parameter may include a value indicative of a minimum round trip time in a cell for NTN communications.

In certain aspects, the second timing offset parameter may be derived using a reference point in the coverage area of the NTN, for example, as described herein with respect to the method 900. The second timing offset parameter may have a value derived from a reference point (e.g., the reference point 420) within a coverage area of a cell (e.g., the NTN 140).

For certain aspects, the UE may have multiple values for the second timing offset parameter, where the UE selects one of the values and indicates to the network the selected value, for example, as described herein with respect to the method 900. The network entity may receive, from the UE, an indication of a value for the second timing offset parameter, and the network entity may use the UE's value for the second timing offset parameter in determining the start position of the RAR window. The network entity may receive the indication of the value for the second timing offset parameter via the PRACH preamble, for example, based on a preamble sequence and/or resource associated with the value.

In certain aspects, the duration between the RA occasion and the start point may be determined based at least in part on parameters related to the RTT between the UE and BS, such as the common TA and/or the $K_{mac}$ value, as described herein with respect to the method 900. For example, the network entity may determine the duration between the RA occasion and the RAR window in terms of subframes (or slots) according to the following expression:

$$X' = \max(K_{mac}, X) \quad (6)$$

The duration between the RA occasion and the start position includes a greatest value among the first timing offset parameter and a parameter indicative of a portion of the round trip time (e.g., $K_{mac}$).

For certain aspects, the offset to the RAR window may start at another occasion preceding the RA occasion including the end of the preamble transmission or last preamble repetition by at least the TA common value in terms of subframes (or slots). The duration between the other occasion and the start position of the RAR window may be determined according to the following expression for X':

$$X' = \max(TA_{common} + K_{mac}, X) \quad (7)$$

The start position of X' may be at subframe (or slot) n', where subframe n' is at the subframe (n) with the end of the preamble transmission or last preamble repetition minus the TA common value. The duration (X') between another occasion (e.g., subframe n') and the start position of the RAR window may include a greatest value among the first timing offset parameter and a sum of a common timing advance parameter and a parameter indicative of a portion of the round trip time (e.g., $K_{mac}$).

As an example, the network entity may determine the start position of the RAR window based on the duration given by Expression (6) or Expression (7). In the case of Expression (7), the network entity may determine the duration between a subframe (or slot) preceding the RA occasion and the start position. For example, the network entity may determine another duration between another occasion and the start position, where the other occasion is offset from (e.g., precedes) the RA occasion by at least the value for a common timing advance parameter (TA common). The network entity may transmit the RAR in the RAR window with the start position offset from the other occasion by at least the other duration, where the other duration includes a greatest value among the first timing offset parameter and a sum between the common timing advance parameter and a parameter indicative of a portion of the round trip time.

In aspects, the network entity may configure the UE with value(s) for the second timing offset parameter and/or other parameters described herein, such as the common TA value and/or $K_{mac}$ value, for example, as described herein with respect to the method 900. The network entity may transmit signaling indicating the first timing offset parameter and/or the second timing offset parameter via at least one of DCI, RRC signaling, MAC signaling, or system information. In certain aspects, the network entity may use a default value for the second timing offset parameter, such as the same value for the first timing offset parameter, if the value for the second timing offset parameter is not signaled to the UE.

While the examples are described herein with respect to determining a start position of a RAR window in terms of one or more subframes or slots to facilitate understanding, aspects of the present disclosure may also be applied to determining the start position of a RAR window in terms of other time domain resource units, such as symbols and/or seconds.

Example Wireless Communication Devices

Figure 11:
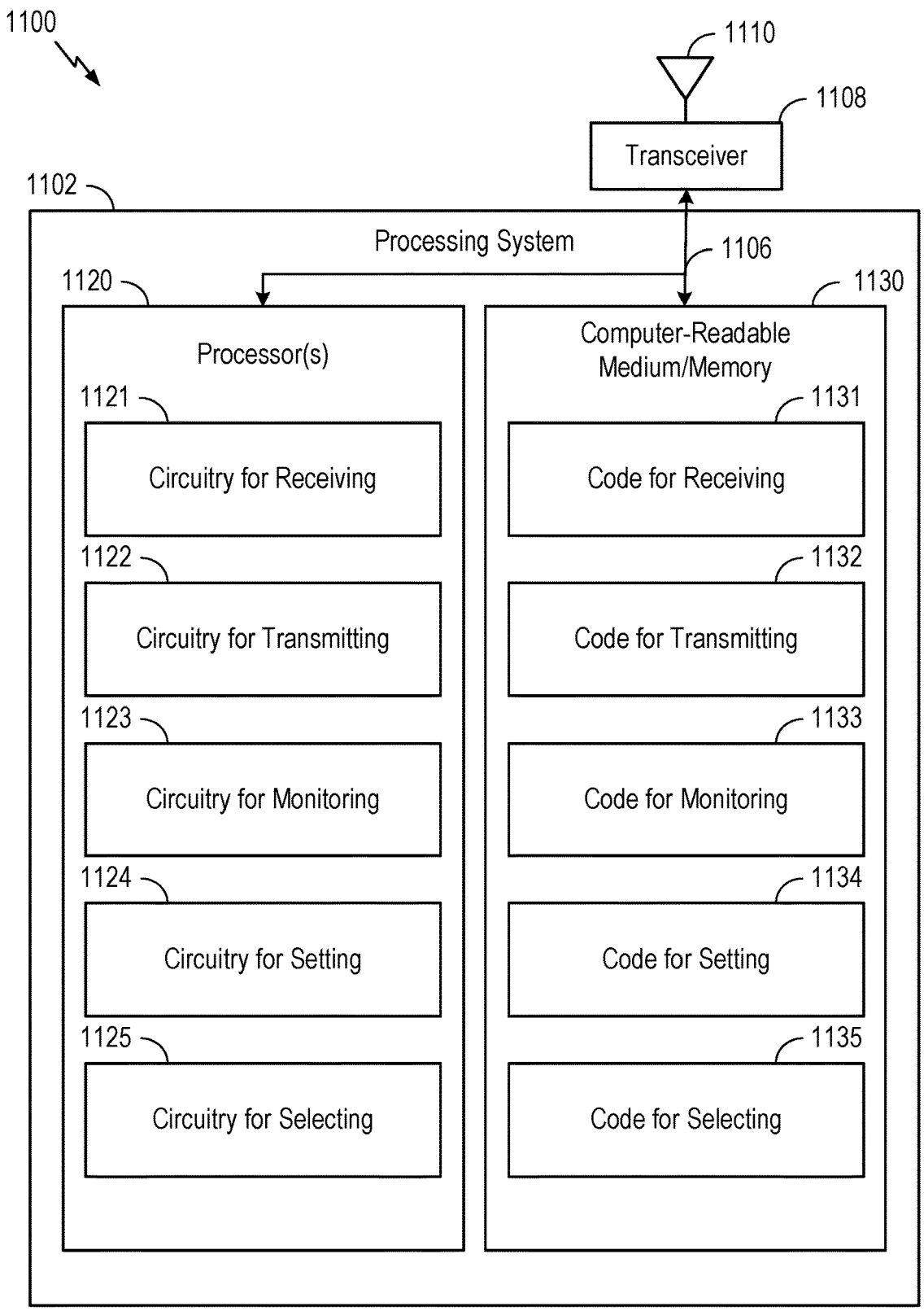
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 7-9. In some examples, communication device 1100 may be a user equipment 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7-9, or other operations for performing the various techniques discussed herein for determining a start position for a RAR window.

In the depicted example, computer-readable medium/memory 1130 stores code 1131 for receiving, code 1132 for transmitting (and/or signaling), code 1133 for monitoring, code 1134 for setting, and/or code 1135 for selecting.

In the depicted example, the one or more processors 1120 include circuitry configured to implement the code stored in the computer-readable medium/memory 1130, including circuitry 1121 for receiving, circuitry 1122 for transmitting (and/or signaling), circuitry 1123 for monitoring, circuitry 1124 for setting, and/or circuitry 1125 for selecting.

Various components of communications device 1100 may provide means for performing the methods described herein, including with respect to FIGS. 7-9.

In some examples, means for transmitting or sending (or means for outputting or signaling for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for monitoring, setting, and/or selecting may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including the random access component 281).

Notably, the communications device 1100 depicted in FIG. 11 is an example, and many other examples and configurations of communications device 1100 are possible.

Figure 12:
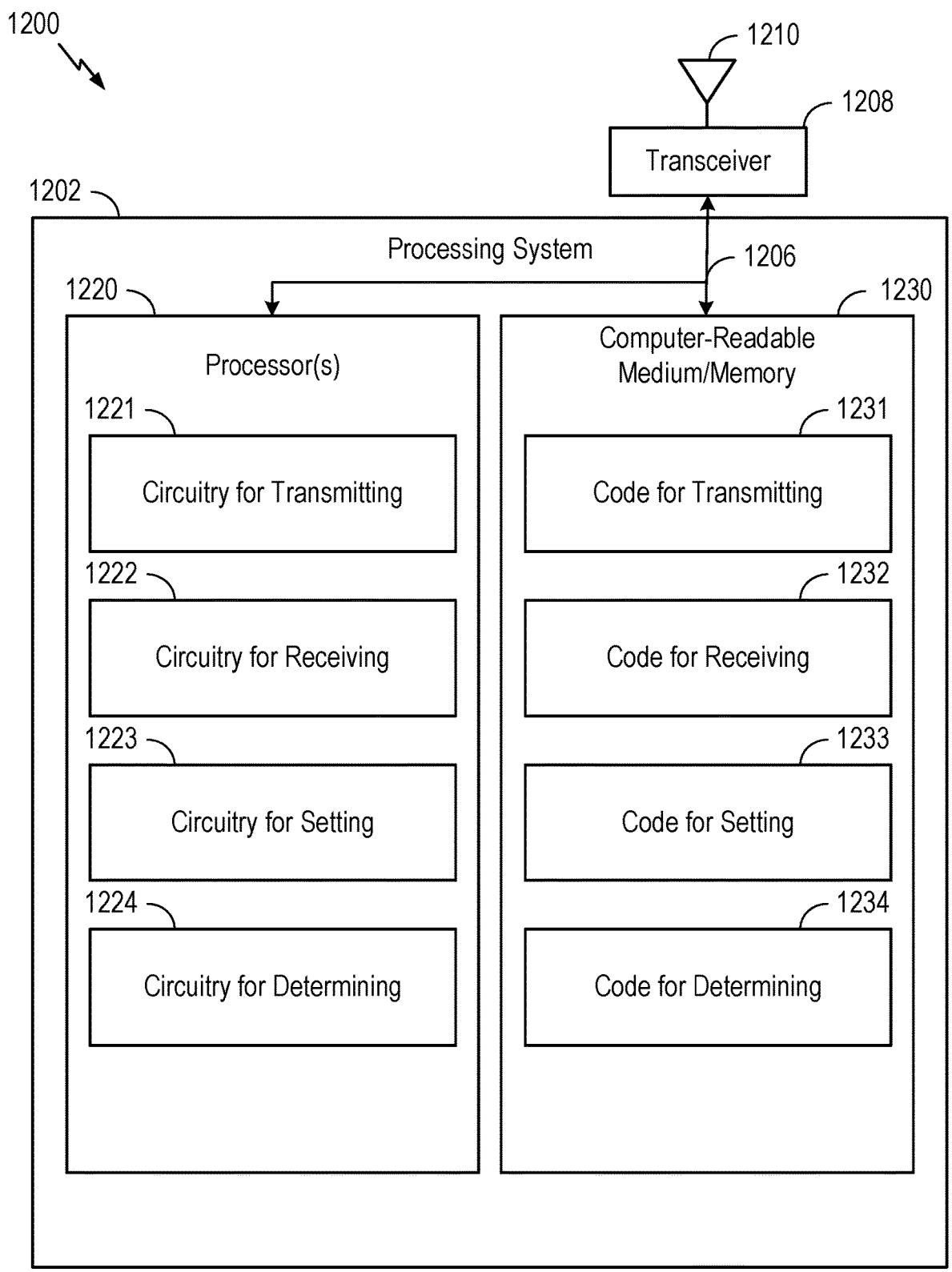
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 7, 8, and 10. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 7, 8, and 10, or other operations for performing the various techniques discussed herein for determining a start position for a RAR window.

In the depicted example, computer-readable medium/memory 1230 stores code 1231 for transmitting, code 1232 for receiving, code 1233 for setting, and/or code 1234 for determining.

In the depicted example, the one or more processors 1220 include circuitry configured to implement the code stored in the computer-readable medium/memory 1230, including circuitry 1221 for transmitting, circuitry 1222 for receiving, circuitry 1223 for setting, and/or circuitry 1224 for determining.

Various components of communications device 1200 may provide means for performing the methods described herein, including with respect to FIGS. 7, 8, and 10.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some examples, means for . . . may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including the random access component 241).

Notably, the communication device 1200 depicted in FIG. 12 is an example, and many other examples and configurations of communications device 1200 are possible.

Example Clauses

Implementation examples are described in the following numbered clauses:

Clause 1: A method of wireless communication by a user equipment (UE), comprising: transmitting a physical random access channel (PRACH) preamble to a network entity in a random access (RA) occasion; and monitoring for a random access response (RAR) within a RAR window with a start position determined based at least in part on the RA occasion, round trip time parameters for non-terrestrial network communications, and one or more timing offset parameters.

Clause 2: The method of Clause 1, wherein the one or more timing offset parameters include a first timing offset parameter and a second timing offset parameter; a duration between the RA occasion and the start position is determined based at least in part on the round trip time parameters, the first timing offset parameter, and the second timing offset parameter; and the RA occasion corresponds to a transmission of a last repetition of the PRACH preamble.

Clause 3: The method of Clause 2, wherein the duration includes a round trip time for the non-terrestrial network communications plus a greatest value among zero and a difference of the first timing offset parameter and the second timing offset parameter.

Clause 4: The method according to any of Clause 2 or Clause 3, further comprising receiving the signaling indicating the second timing offset parameter via at least one of downlink control information, radio resource control signaling, medium access control signaling, or system information.

Clause 5: The method according to any of Clauses 1-4, wherein the first timing offset is specified as a minimum gap used between the transmission of the last repetition of the preamble and the start position of the RAR window.

Clause 6: The method according to any of Clauses 2-5, further comprising setting a value for the second timing offset parameter to be equal to the first timing offset parameter if the value for the second timing offset parameter is not signaled to the UE.

Clause 7: The method according to any of Clauses 2-5, wherein the second timing offset parameter includes a value indicative of a minimum round trip time in a cell for non-terrestrial network communications.

Clause 8: The method according to any of Clauses 2-5, wherein the second timing offset parameter has a value derived from a reference point within a coverage area of a cell.

Clause 9: The method according to any of Clauses 2-8, further comprising: selecting a value for the second timing offset parameter from a plurality of values based at least in part on the round trip time; and signaling, to the network entity, an indication of the value selected for the second timing offset parameter.

Clause 10: The method of Clause 9, wherein signaling the indication to the network entity comprises signaling the indication via transmission of the PRACH preamble.

Clause 11: The method of Clause 1, wherein a duration between the RA occasion and the start position includes a timing advance associated with the UE plus a greatest value among the one or more timing offset parameters and a parameter indicative of a portion of a round trip time for the non-terrestrial network communications, wherein the RA occasion corresponds to a transmission of a last repetition of the PRACH preamble.

Clause 12: The method of Clause 1, wherein a duration between the RA occasion and the start position includes a timing advance associated with a service link of the UE plus a greatest value among the one or more timing offset parameters and a sum of a common timing advance parameter and a parameter indicative of a portion of a round trip time for the non-terrestrial network communications, wherein the RA occasion corresponds to a transmission of a last repetition of the PRACH preamble.

Clause 13: A method of wireless communication by a network entity, comprising: receiving a physical random access channel (PRACH) preamble from a user equipment (UE) in a random access (RA) occasion; and transmitting a random access response (RAR) in a RAR window with a start position determined based at least in part on the RA occasion, a parameter indicative of a portion of a round trip time for non-terrestrial network communications, and one or more timing offset parameters.

Clause 14: The method of Clause 13, wherein the one or more timing offset parameters include a first timing offset parameter and a second timing offset parameter; and a duration between the RA occasion and the start position is determined based at least in part on the parameter indicative of the portion of the round trip time, the first timing offset parameter, and the second timing offset parameter.

Clause 15: The method of Clause 14, wherein the duration includes the parameter indicative of the portion of the round trip time plus a greatest value among zero and a difference of the first timing offset parameter and the second timing offset parameter.

Clause 16: The method according to any of Clause 14 or Clause 15, further comprising transmitting signaling indicating the second timing offset parameter via at least one of downlink control information, radio resource control signaling, medium access control signaling, or system information.

Clause 17: The method according to any of Clauses 14-16, wherein the first timing offset is specified as minimum gap used between a transmission of a last repetition of the preamble and the start position of the RAR window.

Clause 18: The method according to any of Clauses 14-17, further comprising setting a value for the second timing offset parameter to be equal to the first timing offset parameter if the value for the second timing offset parameter is not signaled to the UE.

Clause 19: The method according to any of Clauses 14-17, wherein the second timing offset parameter includes a value indicative of a minimum round trip time in a cell for non-terrestrial network communications.

Clause 20: The method according to any of Clauses 14-17, wherein the second timing offset parameter has a value derived from a reference point within a coverage area of a cell.

Clause 21: The method according to any of Clauses 14-20, further comprising receiving, from the UE, an indication of a value for the second timing offset parameter.

Clause 22: The method of Clause 21, wherein receiving the indication comprises receiving the indication via the PRACH preamble.

Clause 23: The method of Clause 13, wherein a duration between the RA occasion and the start position includes a greatest value among the one or more timing offset parameters and the parameter indicative of the portion of the round trip time.

Clause 24: The method of Clause 13, further comprising: determining another duration between another occasion and the start position, wherein the other occasion is precedes the RA occasion by at least a common timing advance parameter; wherein transmitting the RAR comprises transmitting the RAR in the RAR window with the start position offset from the other occasion by at least the other duration; and wherein the other duration includes a greatest value among the one or more timing offset parameters and a sum of the common timing advance parameter and the parameter indicative of the portion of the round trip time.

Clause 25: A method of wireless communication by a user equipment (UE), comprising: transmitting a physical random access channel (PRACH) preamble in a random access (RA) occasion; and monitoring for a random access response (RAR) within a RAR window with a start position determined based at least in part on the RA occasion, round trip time parameters for non-terrestrial network communications, and one or more timing offset parameters.

Clause 26: The method of Clause 25, wherein: the one or more timing offset parameters include a first timing offset parameter and a second timing offset parameter; a duration between the RA occasion and the start position is determined based at least in part on the round trip time parameters, the first timing offset parameter, and the second timing offset parameter; and the RA occasion corresponds to a transmission of a last repetition of the PRACH preamble.

Clause 27: The method of Clause 26, wherein the duration includes a round trip time for the non-terrestrial network communications plus a greatest value among zero and a difference of the first timing offset parameter and the second timing offset parameter.

Clause 28: The method of Clause 26 or Clause 27, further comprising receiving signaling indicating the second timing offset parameter via at least one of downlink control information, radio resource control signaling, medium access control signaling, or system information.

Clause 29: The method according to any of Clauses 26-28, wherein the first timing offset is specified as a minimum gap used between the transmission of the last repetition of the preamble and the start position of the RAR window.

Clause 30: The method of Clause 27 or 29, further comprising setting a value for the second timing offset parameter to be equal to the first timing offset parameter if the value for the second timing offset parameter is not signaled to the UE.

Clause 31: The method according to any of Clauses 27-30, wherein the second timing offset parameter includes a value indicative of a minimum round trip time in a cell for non-terrestrial network communications.

Clause 32: The method according to any of Clauses 27-31, wherein the second timing offset parameter has a value derived from a reference point within a coverage area of a cell.

Clause 33: The method according to any of Clauses 27-32, further comprising: selecting a value for the second timing offset parameter from a plurality of values based at least in part on the round trip time; and signaling an indication of the value selected for the second timing offset parameter.

Clause 34: The method of Clause 33, wherein signaling the indication comprises signaling the indication via transmission of the PRACH preamble.

Clause 35: The method according to any of Clauses 25-34, wherein a duration between the RA occasion and the start position includes a timing advance associated with the UE plus a greatest value among the one or more timing offset parameters and a parameter indicative of a portion of a round trip time for the non-terrestrial network communications, wherein the RA occasion corresponds to a transmission of a last repetition of the PRACH preamble.

Clause 36: The method according to any of Clauses 25-35, wherein a duration between the RA occasion and the start position includes a timing advance associated with a service link of the UE plus a greatest value among the one or more timing offset parameters and a sum of a common timing advance parameter and a parameter indicative of a portion of a round trip time for the non-terrestrial network communications, wherein the RA occasion corresponds to a transmission of a last repetition of the PRACH preamble.

Clause 37: A method of wireless communication by a network entity, comprising: receiving a physical random access channel (PRACH) preamble in a random access (RA) occasion; and transmitting a random access response (RAR) in a RAR window with a start position determined based at least in part on the RA occasion, a parameter indicative of a portion of a round trip time for non-terrestrial network communications, and one or more timing offset parameters.

Clause 38: The method of Clause 37, wherein: the one or more timing offset parameters include a first timing offset parameter and a second timing offset parameter; and a duration between the RA occasion and the start position is determined based at least in part on the parameter indicative of the portion of the round trip time, the first timing offset parameter, and the second timing offset parameter.

Clause 39: The method of Clause 38, wherein the duration includes the parameter indicative of the portion of the round trip time plus a greatest value among zero and a difference of the first timing offset parameter and the second timing offset parameter.

Clause 40: The method of Clause 38 or Clause 39, further comprising transmitting signaling indicating the second timing offset parameter via at least one of downlink control information, radio resource control signaling, medium access control signaling, or system information.

Clause 41: The method according to any of Clauses 38-40, wherein the first timing offset is specified as a minimum gap used between a transmission of a last repetition of the preamble and the start position of the RAR window.

Clause 42: The method of Clause 39 or Clause 41, further comprising setting a value for the second timing offset parameter to be equal to the first timing offset parameter if the value for the second timing offset parameter is not signaled to a user equipment.

Clause 43: The method according to any of Clauses 39-42, wherein the second timing offset parameter includes a value indicative of a minimum round trip time in a cell for non-terrestrial network communications.

Clause 44: The method according to any of Clauses 39-43, wherein the second timing offset parameter has a value derived from a reference point within a coverage area of a cell.

Clause 45: The method according to any of Clauses 39-45, further comprising receiving an indication of a value for the second timing offset parameter.

Clause 46: The method of Clause 45, wherein receiving the indication comprises receiving the indication via the PRACH preamble.

Clause 47: The method according to any of Clauses 37-46, wherein a duration between the RA occasion and the start position includes a greatest value among the one or more timing offset parameters and the parameter indicative of the portion of the round trip time.

Clause 48: The method according to any of Clauses 37-47, further comprising: determining another duration between another occasion and the start position, wherein the other occasion precedes the RA occasion by at least a common timing advance parameter; wherein transmitting the RAR comprises transmitting the RAR in the RAR window with the start position offset from the other occasion by at least the other duration; and wherein the other duration includes a greatest value among the one or more timing offset parameters and a sum of the common timing advance parameter and the parameter indicative of the portion of the round trip time.

Clause 49: An apparatus for wireless communication, comprising: a memory; and a processor coupled to the memory, the processor and the memory being configured to: transmit a physical random access channel (PRACH) preamble to a network entity in a random access (RA) occasion, and monitor for a random access response (RAR) within a RAR window with a start position determined based at least in part on the RA occasion, round trip time parameters for non-terrestrial network communications, and one or more timing offset parameters.

Clause 50: The apparatus of Clause 49, wherein: the one or more timing offset parameters include a first timing offset parameter and a second timing offset parameter; a duration between the RA occasion and the start position is determined based at least in part on the round trip time parameters, the first timing offset parameter, and the second timing offset parameter; and the RA occasion corresponds to a transmission of a last repetition of the PRACH preamble.

Clause 51: The apparatus of Clause 50, wherein the duration includes a round trip time for the non-terrestrial network communications plus a greatest value among zero and a difference of the first timing offset parameter and the second timing offset parameter.

Clause 52: An apparatus for wireless communication, comprising: a memory; and a processor coupled to the memory, the processor and the memory being configured to: receive a physical random access channel (PRACH) preamble in a random access (RA) occasion, and transmit a random access response (RAR) in a RAR window with a start position determined based at least in part on the RA occasion, a parameter indicative of a portion of a round trip time for non-terrestrial network communications, and one or more timing offset parameters.

Clause 53: The apparatus of Clause 52, wherein: the one or more timing offset parameters include a first timing offset parameter and a second timing offset parameter; and a duration between the RA occasion and the start position is determined based at least in part on the parameter indicative of the portion of the round trip time, the first timing offset parameter, and the second timing offset parameter.

Clause 54: The apparatus of Clause 53, wherein the duration includes the parameter indicative of the portion of the round trip time plus a greatest value among zero and a difference of the first timing offset parameter and the second timing offset parameter.

Clause 55: An apparatus, comprising: a memory comprising executable instructions; one or more processors configured to execute the executable instructions and cause the apparatus to perform a method in accordance with any of Clauses 1-48.

Clause 56: An apparatus, comprising means for performing a method in accordance with any of Clauses 1-48.

Clause 57: A non-transitory computer-readable medium comprising executable instructions that, when executed by one or more processors of an apparatus, cause the apparatus to perform a method in accordance with any of Clauses 1-48.

Clause 58: A computer program product embodied on a computer-readable storage medium comprising code for performing a method in accordance with any of Clauses 1-48.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of random access channel transmissions in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks.

The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus of wireless communication by a user equipment (UE), comprising:
    a memory comprising instructions; and
    one or more processors configured to execute the instructions and cause the apparatus to:
        transmit a physical random access channel (PRACH) preamble in a random access (RA) occasion; and
        monitor for a random access response (RAR) within a RAR window with a start position determined based at least in part on a subframe or a slot for a transmission of a last repetition of the PRACH preamble, round trip time parameters for non-terrestrial network communications, and one or more timing offset parameters,
    wherein one of the one or more timing offset parameters comprises a value that is based on a reference point within a coverage area of a non-terrestrial network, and
    wherein a duration between the RA occasion and the start position is based on a timing advance associated with the UE, a greatest value among the one or more timing offset parameters and a parameter indicative of a portion of a round trip time for the non-terrestrial network communications.

2. The apparatus of claim 1, wherein:
    the one or more timing offset parameters include a first timing offset parameter and a second timing offset parameter; and
    a duration between the RA occasion and the start position is based at least in part on the round trip time parameters, the first timing offset parameter, and the second timing offset parameter.

3. The apparatus of claim 2, wherein the duration includes a round trip time for the non-terrestrial network communications plus a greatest value among zero and a difference of the first timing offset parameter and the second timing offset parameter.

4. The apparatus of claim 3, wherein the one or more processors are configured to execute the instructions and cause the apparatus to set a value for the second timing offset parameter to be equal to the first timing offset parameter if the value for the second timing offset parameter is not signaled to the UE.

5. The apparatus of claim 3, wherein the second timing offset parameter includes a value indicative of a minimum round trip time in a cell for non-terrestrial network communications.

6. The apparatus of claim 3, wherein the second timing offset parameter has a value derived from a reference point within a coverage area of a cell.

7. The apparatus of claim 3, wherein the one or more processors are configured to execute the instructions and cause the apparatus to:
    select a value for the second timing offset parameter from a plurality of values based at least in part on the round trip time; and
    signal an indication of the value selected for the second timing offset parameter.

8. An apparatus of wireless communication by a user equipment (UE), comprising:
    a memory comprising instructions; and
    one or more processors configured to execute the instructions and cause the apparatus to:
        transmit a physical random access channel (PRACH) preamble in a random access (RA) occasion; and
        monitor for a random access response (RAR) within a RAR window with a start position determined based at least in part on a subframe or a slot for a transmission of a last repetition of the PRACH preamble, round trip time parameters for non-terrestrial network communications, and one or more timing offset parameters,
    wherein one of the one or more timing offset parameters comprises a value that is based on a reference point within a coverage area of a non-terrestrial network,
    wherein the one or more timing offset parameters include a first timing offset parameter and a second timing offset parameter, and
    wherein the one or more processors are further configured to execute the instructions and cause the apparatus to:
        determine a duration between the RA occasion and the start position based at least in part on the round trip time parameters, the first timing offset parameter, and the second timing offset parameter,
        select a value for the second timing offset parameter from a plurality of values based at least in part on the round trip time; and
        signal, via transmission of the PRACH preamble, an indication of the value selected for the second timing offset parameter,
    wherein the duration includes a round trip time for the non-terrestrial network communications plus a greatest value among zero and a difference of the first timing offset parameter and the second timing offset parameter.

9. The apparatus of claim 2, wherein the one or more processors are configured to execute the instructions and cause the apparatus to receive signaling indicating the second timing offset parameter via at least one of downlink control information, radio resource control signaling, medium access control signaling, or system information.

10. The apparatus of claim 2, wherein the first timing offset is specified as a minimum gap used between the transmission of the last repetition of the preamble and the start position of the RAR window.

11. The apparatus of claim 1, wherein the duration between the RA occasion and the start position includes the timing advance associated with the UE plus the greatest value among the one or more timing offset parameters and the parameter indicative of the portion of a round trip time for the non-terrestrial network communications.

12. The apparatus of claim 1, wherein the duration between the RA occasion and the start position includes the timing advance plus the greatest value among the one or more timing offset parameters and a sum of a common timing advance parameter and the parameter indicative of a portion of a round trip time for the non-terrestrial network communications, wherein the timing advance is associated with a service link of the UE.

13. An apparatus of wireless communication by a network entity, comprising:
  a memory comprising instructions; and
  one or more processors configured to execute the instructions and cause the apparatus to:
    receive a physical random access channel (PRACH) preamble in a random access (RA) occasion; and
    transmit a random access response (RAR) in a RAR window with a start position determined based at least in part on a subframe or a slot for a transmission of a last repetition of the PRACH preamble, a parameter indicative of a portion of a round trip time for non-terrestrial network communications, and one or more timing offset parameters, wherein one of the one or more timing offset parameters comprises a value that is based on a reference point within a coverage area of a non-terrestrial network,
  wherein a duration between the RA occasion and the start position is based on a timing advance associated with the UE, a greatest value among the one or more timing offset parameters and a parameter indicative of a portion of a round trip time for the non-terrestrial network communications.

14. The apparatus of claim 13, wherein:
  the one or more timing offset parameters include a first timing offset parameter and a second timing offset parameter; and
  a duration between the RA occasion and the start position is based at least in part on the parameter indicative of the portion of the round trip time, the first timing offset parameter, and the second timing offset parameter.

15. The apparatus of claim 14, wherein the duration includes the parameter indicative of the portion of the round trip time plus a greatest value among zero and a difference of the first timing offset parameter and the second timing offset parameter.

16. The apparatus of claim 15, wherein the one or more processors are configured to execute the instructions and cause the apparatus to set a value for the second timing offset parameter to be equal to the first timing offset parameter if the value for the second timing offset parameter is not signaled to a user equipment.

17. The apparatus of claim 15, wherein the second timing offset parameter includes a value indicative of a minimum round trip time in a cell for non-terrestrial network communications.

18. The apparatus of claim 15, wherein the second timing offset parameter has a value derived from a reference point within a coverage area of a cell.

19. The apparatus of claim 15, wherein the one or more processors are configured to execute the instructions and cause the apparatus to receive an indication of a value for the second timing offset parameter.

20. An apparatus of wireless communication by a network entity, comprising:
  a memory comprising instructions; and
  one or more processors configured to execute the instructions and cause the apparatus to:
    receive a physical random access channel (PRACH) preamble in a random access (RA) occasion; and
    transmit a random access response (RAR) in a RAR window with a start position determined based at least in part on a subframe or a slot for a transmission of a last repetition of the PRACH preamble, a parameter indicative of a portion of a round trip time for non-terrestrial network communications, and one or more timing offset parameters,
  wherein one of the one or more timing offset parameters comprises a value that is based on a reference point within a coverage area of a non-terrestrial network,
  wherein the one or more timing offset parameters include a first timing offset parameter and a second timing offset parameter,
  wherein the one or more processors are further configured to execute the instructions and cause the apparatus to:
    determine a duration between the RA occasion and the start position based at least in part on the parameter indicative of the portion of the round trip time, the first timing offset parameter, and the second timing offset parameter;
    receive, via the PRACH preamble, an indication of a value for the second timing offset parameter,
  wherein the duration includes the parameter indicative of the portion of the round trip time plus a greatest value among zero and a difference of the first timing offset parameter and the second timing offset parameter.

21. The apparatus of claim 14, wherein the one or more processors are configured to execute the instructions and cause the apparatus to transmit signaling indicating the second timing offset parameter via at least one of downlink control information, radio resource control signaling, medium access control signaling, or system information.

22. The apparatus of claim 14, wherein the first timing offset is specified as minimum gap used between a transmission of a last repetition of the preamble and the start position of the RAR window.

23. The apparatus of claim 13, wherein a duration between the RA occasion and the start position includes a greatest value among the one or more timing offset parameters and the parameter indicative of the portion of the round trip time.

24. The apparatus of claim 13, wherein the one or more processors are configured to execute the instructions and cause the apparatus to:

determine another duration between another occasion and the start position, wherein the other occasion precedes the RA occasion by at least a common timing advance parameter;

wherein to transmit the RAR, the one or more processors are configured to execute the instructions and cause the apparatus to transmit the RAR in the RAR window with the start position offset from the other occasion by at least the other duration; and wherein the other duration includes a greatest value among the one or more timing offset parameters and a sum of the common timing advance parameter and the parameter indicative of the portion of the round trip time.

25. The apparatus of claim 13, wherein the duration between the RA occasion and the start position includes the timing advance associated with the UE plus the greatest value among the one or more timing offset parameters and the parameter indicative of the portion of a round trip time for the non-terrestrial network communications.

26. The apparatus of claim 13, wherein the duration between the RA occasion and the start position includes the timing advance plus the greatest value among the one or more timing offset parameters and a sum of a common timing advance parameter and the parameter indicative of a portion of a round trip time for the non-terrestrial network communications, wherein the timing advance is associated with a service link of the UE.

\* \* \* \* \*